(12) United States Patent
Ogino et al.

(10) Patent No.: US 12,148,908 B2
(45) Date of Patent: Nov. 19, 2024

(54) BATTERY MODULE

(71) Applicant: Panasonic Intellectual Property Management Co., Ltd., Osaka (JP)

(72) Inventors: Hirotaka Ogino, Osaka (JP); Toshiya Gotou, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 890 days.

(21) Appl. No.: 17/262,689

(22) PCT Filed: Jul. 30, 2019

(86) PCT No.: PCT/JP2019/029816
§ 371 (c)(1),
(2) Date: Jan. 22, 2021

(87) PCT Pub. No.: WO2020/027120
PCT Pub. Date: Feb. 6, 2020

(65) Prior Publication Data
US 2021/0167443 A1 Jun. 3, 2021

(30) Foreign Application Priority Data

Jul. 31, 2018 (JP) .................................. 2018-144115
Jul. 31, 2018 (JP) .................................. 2018-144116

(51) Int. Cl.
*H01M 10/6556* (2014.01)
*H01M 10/04* (2006.01)
(Continued)

(52) U.S. Cl.
CPC ... *H01M 10/6556* (2015.04); *H01M 10/0481* (2013.01); *H01M 10/613* (2015.04);
(Continued)

(58) Field of Classification Search
CPC ......... H01M 10/6556; H01M 10/6567; H01M 10/6568; H01M 10/613; H01M 10/617;
(Continued)

(56) References Cited

U.S. PATENT DOCUMENTS

| 9,159,973 B2 | 10/2015 | Harada et al. |
| 2013/0011713 A1 | 1/2013 | Harada et al. |

(Continued)

FOREIGN PATENT DOCUMENTS

| CN | 106716671 A | 5/2017 |
| JP | 2014-216298 A | 11/2014 |
| KR | 20160065637 | * 6/2016 |

OTHER PUBLICATIONS

KR20160065637 English translation. Bae et al. Korea. Jun. 9, 2016. (Year: 2016).*

(Continued)

*Primary Examiner* — Christopher P Domone
(74) *Attorney, Agent, or Firm* — Rimon P.C.

(57) ABSTRACT

A battery module includes an assembly of a plurality of batteries and a cooling member arranged so as to be heat exchangeable with the assembly. The cooling member is provided with a mixing portion in which refrigerant flows and the flowing refrigerant is mixed.

24 Claims, 12 Drawing Sheets

(51) Int. Cl.
*H01M 10/613* (2014.01)
*H01M 10/617* (2014.01)
*H01M 10/647* (2014.01)
*H01M 10/6552* (2014.01)
*H01M 10/6568* (2014.01)

(52) U.S. Cl.
CPC ....... *H01M 10/617* (2015.04); *H01M 10/647* (2015.04); *H01M 10/6552* (2015.04); *H01M 10/6568* (2015.04)

(58) Field of Classification Search
CPC ........... H01M 10/647; H01M 10/6552; H01M 10/0481
See application file for complete search history.

(56) References Cited

U.S. PATENT DOCUMENTS

| | | | |
|---|---|---|---|
| 2016/0036104 A1 | 2/2016 | Kenney et al. | |
| 2019/0368827 A1* | 12/2019 | Blennius | F28F 9/0263 |
| 2020/0212521 A1* | 7/2020 | Behlen | H01M 10/625 |

OTHER PUBLICATIONS

Interantioanl Search Report issued in corresponding International Patent Application No. PCT/JP2019/029816, dated Sep. 10, 2019, with English translation.

\* cited by examiner

BATTERY MODULE

CROSS-REFERENCE TO RELATED APPLICATIONS

This application is the U.S. National Phase under 35 U.S.C. § 371 of International Patent Application No. PCT/JP2019/029816, filed on Jul. 30, 2019, which in turn claims the benefit of Japanese Patent Application No. 2018-144115, filed on Jul. 31, 2018, and Japanese Patent Application No. 2018-144116, filed on Jul. 31, 2018, the entire disclosures of which applications are incorporated by reference herein.

BACKGROUND

Field of the Invention

The present disclosure relates to a battery module.

Description of the Related Art

For example, as a power source that requires a high output voltage, such as for a vehicle, a battery module having a battery assembly in which a plurality of batteries are connected in series has been known. Regarding such a battery module, Patent Literature 1 discloses a battery module including a cooling plate having a refrigerant flow path and a plurality of batteries conductively coupled to the surface of the cooling plate.

In order to suppress the variation in the charge/discharge amount of each battery and maintain the performance of the battery module, it is desirable to uniformly cool each battery in a battery assembly. On the other hand, in the cooling plate, a temperature boundary layer may develop along the flow of the refrigerant. The temperature boundary layer is a resistance element of heat exchange. Therefore, when the temperature boundary layer develops, the refrigerant on the surface side of the refrigerant flow is exclusively used for heat exchange. For this reason, the cooling efficiency of the batteries decreases toward the downstream side of the refrigerant flow, and it is difficult to uniformly cool the plurality of batteries.

On the other hand, in Patent Literature 1, the development of the temperature boundary layer is suppressed by providing a plurality of portions having a large flow path cross-sectional area in the refrigerant flow path and repeatedly increasing or decreasing the flow rate of the refrigerant. As a result, the cooling efficiency in a direction in which the refrigerant flows is made uniform, and the plurality of batteries are cooled uniformly.

Patent Literature 1: JP 2013-16351 A

In the above-mentioned battery module, since the refrigerant flow path is provided with the portions having a large flow path cross-sectional area, the cooling plate tends to be increased in size. For example, when the large cross-sectional area portions have a shape that extends in the direction in which the adjacent flow paths are aligned, the distance between the adjacent flow paths becomes large, and the area of the cooling plate becomes large. Further, when the large cross-sectional area portions have a shape that extends in the stacking direction of the cooling plate and the batteries, the thickness of the cooling plate becomes large. When the cooling plate is increased in size, the battery module is increased in size.

SUMMARY OF THE INVENTION

The present disclosure has been made in view of such a situation, and an object of the present invention is to provide a technique for making cooling of a battery assembly uniform while avoiding an increase in size of a battery module.

One aspect of the present disclosure is a battery module. The battery module includes an assembly of a plurality of batteries and a cooling member arranged so as to be heat exchangeable with the assembly. The cooling member is provided with a mixing portion in which refrigerant flows and the flowing refrigerant is mixed.

Any combination of the above components and these obtained by converting the expressions of the present disclosure between methods, devices, systems, etc. are also effective as aspects of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
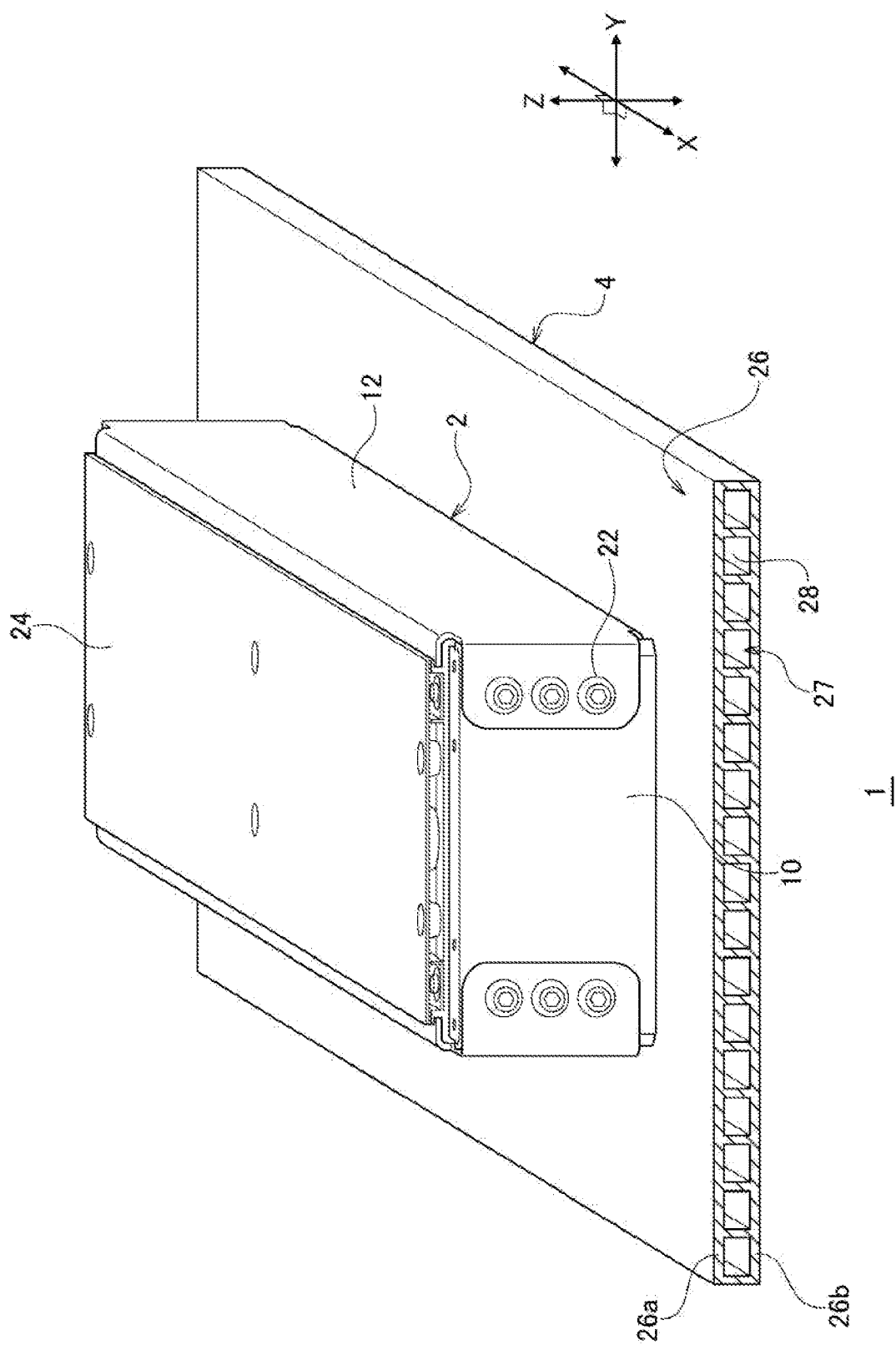
FIG. 1 is a perspective view of a battery module according to a first embodiment.

Hereinafter, the present disclosure will be described based on preferred embodiments with reference to the drawings. The embodiments are not intended to limit the present disclosure, but are exemplary, and all features and combinations thereof described in the embodiments are not necessarily essential to the present disclosure. The same or equivalent components, members, and processes illustrated in each drawing are denoted by the same reference numerals, and duplicated description will be appropriately omitted.

In addition, the scale and shape of each part illustrated in each figure are set for convenience in order to facilitate explanation, and are not limitedly interpreted unless otherwise specified. In addition, when terms such as "first" and "second" are used in the present specification or claims, these terms do not represent any order or importance unless otherwise specified, and are used to distinguish a certain configuration from other configurations. Further, in each drawing, some of the members that are not important for explaining the embodiment are omitted.

First Embodiment

Figure 2:
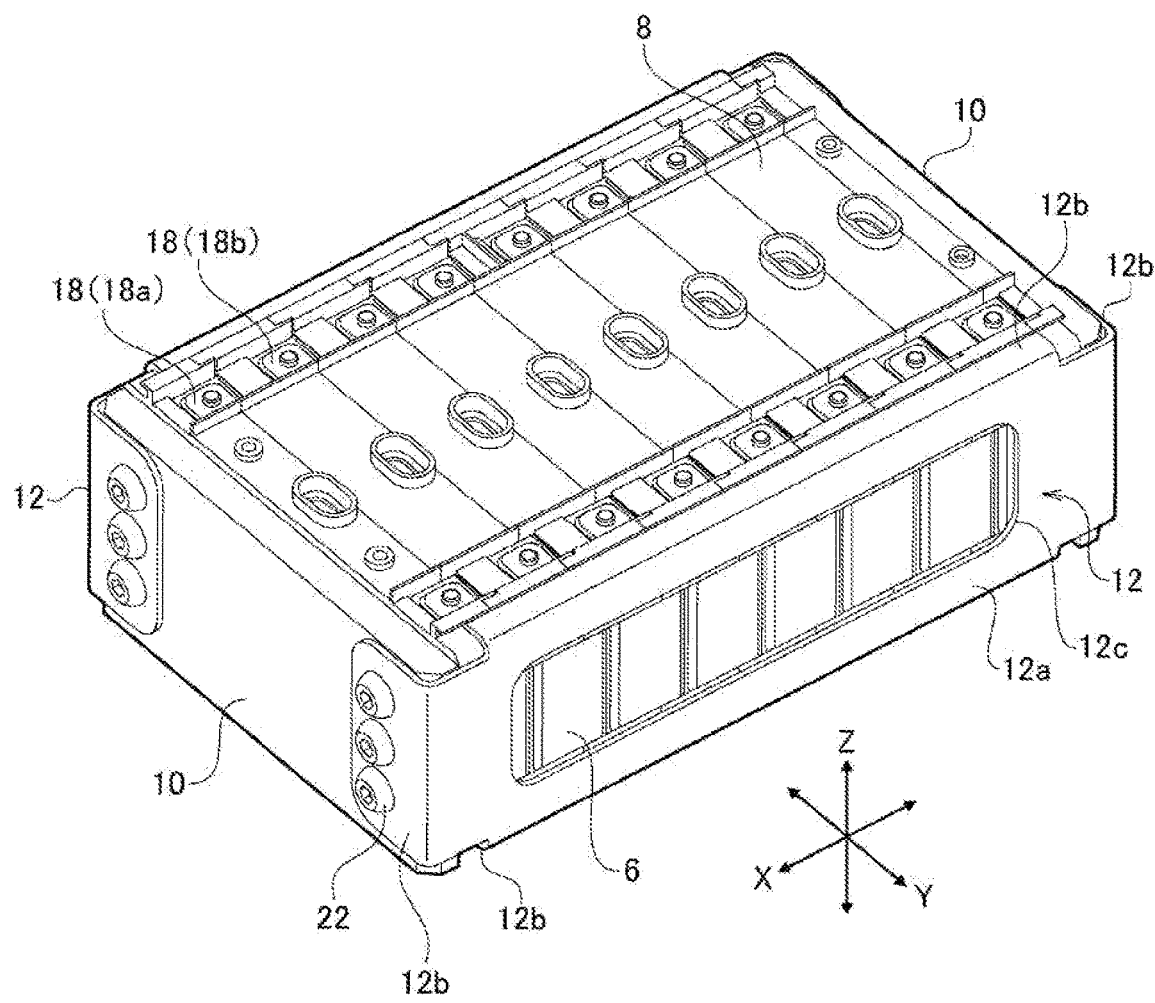
FIG. 2 is a perspective view of an assembly.
Figure 3:
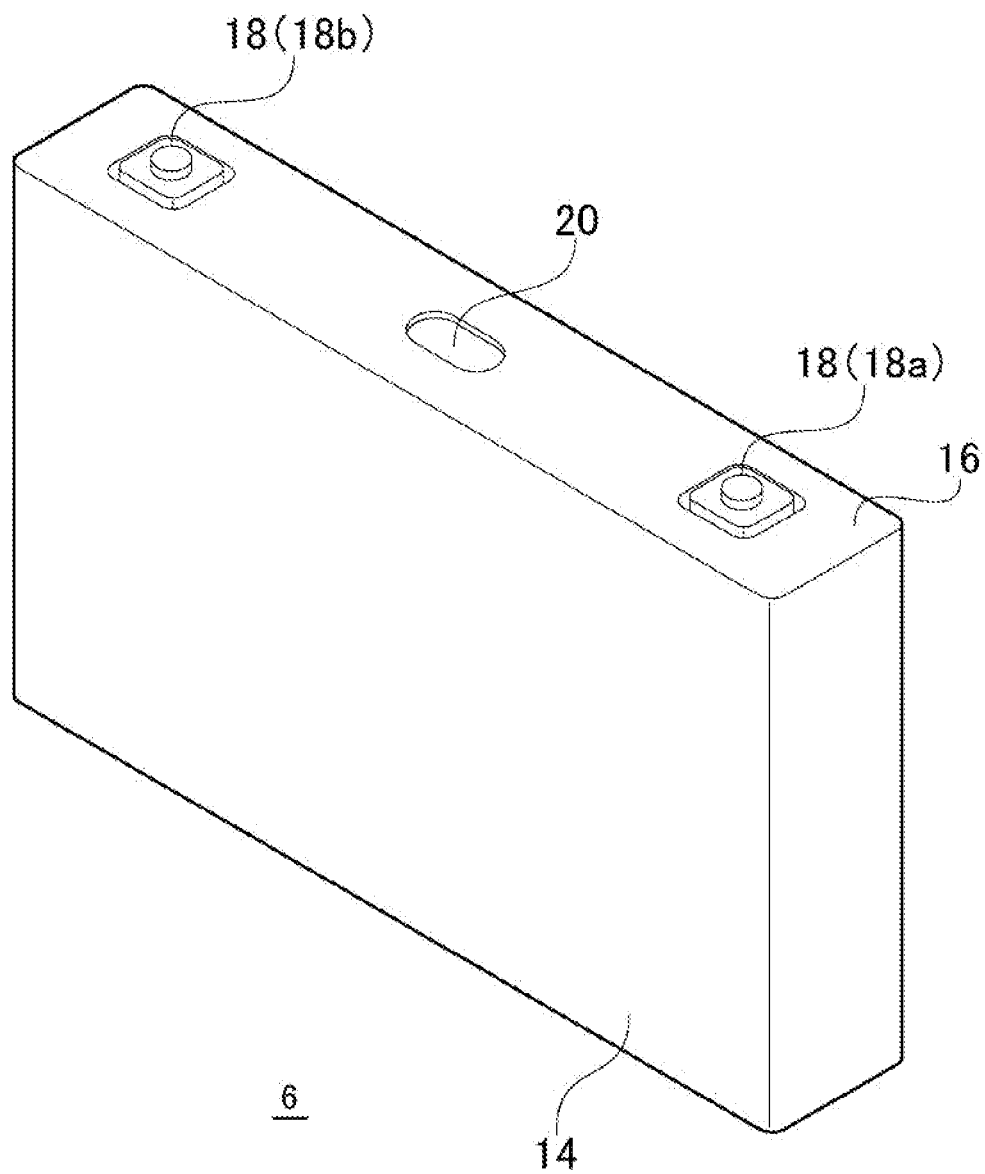
FIG. 3 is a perspective view of a battery.

FIG. 1 is a perspective view of a battery module according to a first embodiment. FIG. 2 is a perspective view of an assembly. FIG. 3 is a perspective view of a battery. In FIG. 1, only a part of a cooling member is illustrated. Further, in FIG. 2, illustration of a cover member is omitted. The battery module 1 includes an assembly 2 and a cooling member 4.

The assembly 2 has a structure in which a plurality of batteries 6 are assembled. The assembly 2 of the present embodiment takes the form of a battery group in which a plurality of flat batteries 6 are stacked. The assembly 2 includes a plurality of batteries 6, a plurality of separators 8, a pair of end plates 10, and a pair of restraining members 12. Although only one battery group is illustrated in FIG. 1, the assembly 2 of the present embodiment includes a plurality of battery groups 3 (see FIG. 6).

Each battery 6 is a rechargeable secondary battery such as a lithium ion battery, a nickel-hydrogen battery, or a nickel-cadmium battery. The battery 6 is a so-called square battery, and has a flat rectangular parallelepiped outer can 14. A substantially rectangular opening (not shown) is provided on one surface of the outer can 14, and an electrode body, an electrolytic solution, or the like is accommodated in the outer can 14 through this opening. A sealing plate 16 for sealing the outer can 14 is provided at the opening of the outer can 14. The sealing plate 16 is, for example, a rectangular plate.

The sealing plate 16 is provided with a positive electrode output terminal 18 near one end in the longitudinal direction and a negative electrode output terminal 18 near the other end. The pair of output terminals 18 are electrically connected to a positive electrode plate and a negative electrode plate constituting the electrode body, respectively. Hereinafter, as appropriate, the positive electrode output terminal 18 will be referred to as a positive electrode terminal 18a, and the negative electrode output terminal 18 will be referred to as a negative electrode terminal 18b. Further, when it is not necessary to distinguish the polarity of the output terminal 18, the positive electrode terminal 18a and the negative electrode terminal 18b are collectively referred to as output terminals 18. The outer can 14 and the sealing plate 16 are conductors, for example, made of metal. For example, the outer can 14 and the sealing plate 16 are made of aluminum, iron, stainless steel, or the like. The sealing plate 16 and the opening of the outer can 14 are joined by, for example, a laser. Each of the pair of output terminals 18 is inserted into a through hole (not shown) formed in the sealing plate 16. An insulating sealing member (not shown) is interposed between each of the pair of output terminals 18 and each through hole.

In the description of the present embodiment, for convenience, the surface on the side where the sealing plate 16 is provided is the upper surface of the battery 6, and the surface on the opposite side (the bottom surface of the outer can 14) is the bottom surface of the battery 6. Further, the battery 6 has four side surfaces connecting the upper surface and the bottom surface. Two of the four side surfaces are a pair of long side surfaces connected to the long sides of the top and bottom. The long side surfaces are the surfaces having the largest area among the six surfaces of the battery 6. The remaining two side surfaces, excluding the two long side surfaces, are a pair of short side surfaces connected to the short sides of the top and bottom. Further, in the assembly 2, the surface on the upper surface side of the battery 6 is the upper surface of the assembly 2, the surface on the bottom surface side of the battery 6 is the bottom surface of the assembly 2, and the surfaces on the short side surface sides of the battery 6 are the side surfaces of the assembly 2. Further, the upper surface side of the assembly 2 is an upper side in the vertical direction, and the bottom surface side of the assembly 2 is a lower side in the vertical direction. These directions and positions are defined for convenience. Therefore, for example, it does not mean that the portion defined as the upper surface in the present disclosure is always located above the portion defined as the bottom surface.

A safety valve 20 is provided between the pair of output terminals 18 on the sealing plate 16. The safety valve 20 is structured to open when the internal pressure of the outer can 14 rises above a predetermined value to release the gas inside. The safety valve 20 of each battery 6 is connected to a gas duct (not shown), and the gas inside the battery is discharged from the safety valve 20 to the gas duct. The safety valve 20 may be formed by, for example, a thin-walled portion provided in a part of the sealing plate 16 and thinner than the other portion, and a linear groove formed on the surface of the thin-walled portion. In this configuration, when the internal pressure of the outer can 14 rises, the thin-walled portion is torn from the groove to open the valve.

Further, the plurality of batteries 6 are arranged side by side at predetermined intervals so that the long side surfaces of the adjacent batteries 6 face each other. In the present embodiment, the direction in which the plurality of batteries 6 are aligned is the direction X. Further, the output terminals 18 of each battery 6 are arranged so as to face the same direction. In the present embodiment, the output terminals 18 of each battery 6 are arranged so as to face the upper side in the vertical direction for convenience. The output terminals 18 of each battery 6 may be arranged so as to face different directions. The two adjacent batteries 6 are stacked so that the positive electrode terminal 18a of one battery 6 and the negative electrode terminal 18b of the other battery 6 are adjacent to each other. The positive electrode terminal 18a and the negative electrode terminal 18b are electrically connected via a bus bar (not shown). The output terminals 18 having the same polarity in the plurality of adjacent batteries 6 may be connected in parallel by a bus bar to form a battery block, and the battery blocks may be connected in series.

The separator 8 is also called an insulating spacer, and is made of, for example, a resin having an insulating property. The separator 8 is arranged between the two adjacent batteries 6 to electrically insulate the two batteries 6. Further, the separator 8 is further arranged between the battery 6 and the end plate 10 to insulate the battery 6 and the end plate 10. Examples of the resin constituting the separator 8 include thermoplastic resins such as polypropylene (PP), polybutylene terephthalate (PBT), polycarbonate (PC), and NORYL (registered trademark) resin (modified PPE).

Further, a part of the separator 8 extends in the direction X and covers the upper surface of the battery 6. As a result, it is possible to secure a creepage distance between the adjacent batteries 6 or between the battery 6 and the end plate 10. Further, the separator 8 has openings at positions corresponding to the output terminals 18 and the safety valve 20 so that each of them is exposed.

The plurality of batteries 6 and the plurality of separators 8 arranged side by side are sandwiched between the pair of end plates 10. The pair of end plates 10 are arranged so as to be adjacent to the batteries 6 located at both ends in the direction X via the separators 8. The end plate 10 is made of, for example, a metal plate. Screw holes (not shown) into which screws 22 are screwed are provided on the surface of the end plate 10 facing the long side surface of the battery 6.

The pair of restraining members 12 are also called bind bars, and are elongated members whose longitudinal direction is the direction X. The pair of restraining members 12 are arranged so as to face each other in the direction Y orthogonal to the direction X and parallel to the longitudinal direction of the sealing plate. The plurality of batteries 6, the plurality of separators 8, and the pair of end plates 10 are interposed between the pair of restraining members 12. Each restraining member 12 has a rectangular flat surface portion 12*a* extending parallel to the short side surface of the battery 6, and four eaves portions 12*b* protruding from end sides of the flat surface portion 12*a* toward the battery 6. The two eaves portions 12*b* facing each other in the direction X are provided with through holes (not shown) through which the screws 22 are inserted. The flat surface portion 12*a* is provided with an opening portion 12*c* that exposes the short side surfaces of the batteries 6.

The plurality of batteries 6 and the plurality of separators 8 are sandwiched in the direction Y by the pair of restraining members 12 under a state where these are alternately arranged and sandwiched in the direction X by the pair of end plates 10. Each restraining member 12 is aligned so that the through holes of the restraining member 12 overlaps with the screw holes of the end plate 10. Then, the screws 22 are inserted into the through holes and screwed into the screw holes. By engaging the pair of restraining members 12 with the pair of end plates 10 in this way, the plurality of batteries 6 are restrained.

The plurality of batteries 6 are tightened in the direction X by the restraining members 12, so that the plurality of batteries 6 are positioned in the direction X. Further, the bottom surfaces of the plurality of batteries 6 abut on the lower eaves portions 12*b* of the restraining members 12 via the separators 8, and the upper surfaces of the plurality of batteries 6 abut on the upper eaves portions 12*b* of the restraining members 12 via the separator 8, so that the plurality of batteries 6 are positioned in the up-down direction. As an example, after these positionings are completed, the bus bar is attached to the output terminals 18 of each battery 6, and the output terminals 18 are electrically connected.

The upper surface of the assembly 2 is covered with a cover member 24. The cover member 24 prevents the contact of condensed water, dust, etc. with the output terminals 18, the bus bar, the safety valves 20, etc. of the batteries 6. The cover member 24 is made of, for example, a resin having an insulating property. The cover member 24 is fixed to the upper surface of the assembly 2 by a well-known fixing structure (not shown) including screws and a well-known locking mechanism.

The cooling member 4 is arranged so as to be heat exchangeable with the assembly 2, and cools each battery 6. The cooling member 4 of the present embodiment is a plate-shaped cooling plate, and the assembly 2 is placed on the long side surface (or main surface) thereof. The assembly 2 is placed on the cooling member 4 so that the bottom surface faces the cooling member 4 side. At this time, the bottom surface of the battery 6 is thermally connected to the cooling member 4 via the eaves portions 12*b* of the restraining members 12. In order to further improve the heat exchange efficiency between the battery 6 and the cooling member 4, a resin sheet or the like having good thermal conductivity may be interposed between the portion of the bottom surface of the battery 6 that is exposed without being covered by the eaves portions 12*b* and the cooling member 4. Alternatively, the entire bottom surface of the battery 6 and the cooling member 4 may be brought into abutment on each other via the above-mentioned resin sheet without providing the eaves portions 12*b* located on the bottom surface side of the battery 6. In this case, the cooling member 4 takes on the function of the eaves portions 12*b* located on the bottom surface side of the battery 6.

The cooling member 4 includes a plate-shaped portion 26 and a hollow portion 27 arranged inside the plate-shaped portion 26 through which the refrigerant flows. The hollow portion 27 includes a plurality of flow paths 28 arranged so as to extend in the direction X. Further, the plurality of flow paths 28 are arranged at predetermined intervals in the direction Y. A refrigerant supply path (not shown) is connected to one end of the hollow portion 27 in the direction X, and a refrigerant discharge path (not shown) is connected to the other end. Therefore, one end side of the hollow portion 27 is upstream of the refrigerant flow, and the other end side is downstream of the refrigerant flow.

The cooling member 4 of the present embodiment is a flat plate-shaped pipe. The plate-shaped portion 26 includes a first plate portion 26*a* facing the assembly 2 and a second plate portion 26*b* the side opposite to the first plate portion 26*a*. The first plate portion 26*a* and the second plate portion 26*b* face each other with a predetermined gap. The hollow portion 27 is arranged in the gap between the first plate portion 26*a* and the second plate portion 26*b*. Such a cooling member 4 can be formed by combining conventionally known methods such as extrusion molding.

The cooling member 4 may be formed by joining the first plate portion 26*a* and the second plate portion 26*b*, which are separate bodies from each other. For example, by joining a plate material having a groove having the shape of the hollow portion 27 and a plate material without a groove by brazing or the like, the cooling member 4 including the hollow portion 27 between the first plate portion 26*a* and the second plate portion 26*b* can be obtained. In this case, the cooling member 4 can be easily manufactured as compared with the case where the hollow portion 27 is formed by hollowing out a solid plate material or the case where the hollow portion 27 is formed by extrusion molding.

The plate-shaped portion 26 is made of a material having high thermal conductivity such as aluminum. The assembly 2 is placed on the plate-shaped portion 26, for example, via the above-mentioned resin sheet having an insulating property and thermal conductivity. Each battery 6 exchanges heat with refrigerant such as water or ethylene glycol flowing through the flow paths 28 via the resin sheet and the plate-shaped portion 26. As a result, each battery 6 is cooled. The plate-shaped portion 26 has an insertion portion 38 into which a fastening member 36 such as a screw is inserted at a predetermined position (see FIG. 5). The assembly 2 and the cooling member 4 are fixed to each other by inserting the fastening member 36 through the insertion portion 38. The insertion portion 38 is arranged in a floating island shape in a merging portion 30 described later. The fastening member 36 may be used not only for fixing the assembly 2 and the cooling member 4, but also for fixing the cooling member 4 to a module case.

Figure 4:
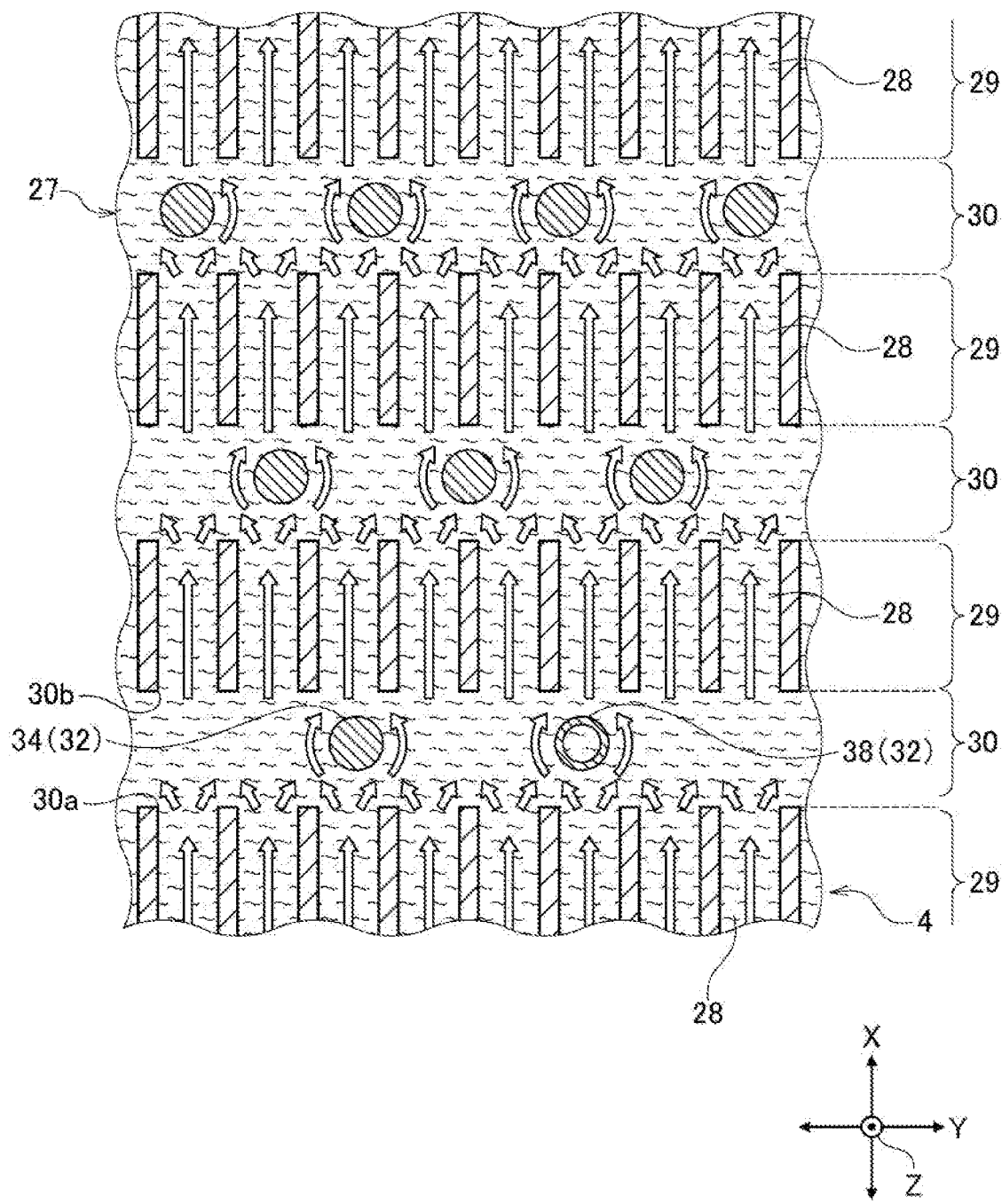
FIG. 4 is an end view schematically illustrating the structure of a cooling member.
Figure 5:
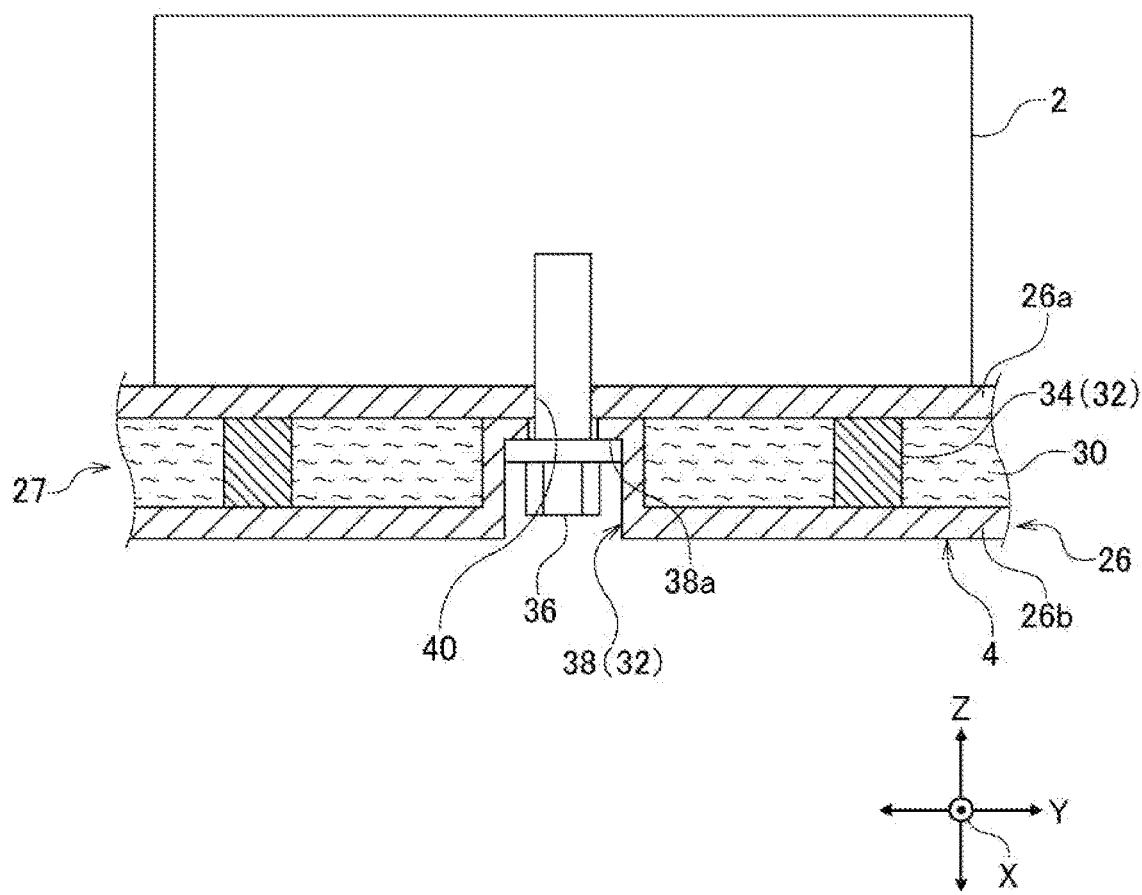
FIG. 5 is an end view schematically illustrating the structure of the cooling member.

Subsequently, the structure of the cooling member 4 will be described in more detail. FIG. 4 is an end view schematically illustrating the structure of the cooling member 4. In FIG. 4, the end face of the cooling member 4 cut along the plane extending in the direction X and the direction Y, that is, the XY plane is illustrated. FIG. 5 is an end view schematically illustrating the structure of the cooling member 4. In FIG. 5, the end face of the cooling member 4 cut along the plane extending in the direction Y and the direction Z (the direction in which the assembly 2 and the cooling member 4 are aligned), that is, the YZ plane is illustrated. In FIGS. 4 and 5, only a part of the cooling member 4 is illustrated. Further, in FIG. 5, the illustration of the assembly 2 is simplified.

The cooling member 4 is provided with a mixing portion in which the refrigerant flows and the flowing refrigerant is mixed. More specifically, the hollow portion 27 of the cooling member 4 includes branch portions 29 each including the plurality of flow paths 28, and the merging portions 30 which are each a space where the plurality of flow paths 28 are merged. At each branch portion 29, the plurality of flow paths 28 extend in direction X and are arranged in the direction Y at predetermined intervals. The hollow portion 27 of the present embodiment includes the plurality of branch portions 29 arranged from the upstream side to the downstream side of the refrigerant flow, and the merging portions 30 are each interposed between the two adjacent branch portions 29. That is, the plurality of merging portions 30 are arranged at predetermined intervals in the extending direction of the flow paths 28. Each merging portion 30 extends in a direction intersecting the extending direction of the flow paths 28 (the direction Y in the present embodiment) and intersects each flow path 28. The refrigerant flowing from each flow path 28 is mixed at the merging portion 30. Therefore, the merging portion 30 functions as the mixing portion. The cooling member 4 of the present embodiment can also be regarded as including the plurality of flow paths 28 extending from one end side to the other end side in the direction X, and the merging portions 30 each connecting the adjacent flow paths 28 in the middle of each flow path 28.

In each flow path 28 on the upstream side of the merging portion 30, there are refrigerant located on the wall surface side of the flow path 28 and having been subjected to heat exchange with the assembly 2 and refrigerant located on the center side of the flow path 28 and not having been subjected to heat exchange with the assembly 2. When these refrigerants reach the merging portion 30, they are mixed together with refrigerants that have flowed in from the other flow paths 28. As a result, the temperature of the entire refrigerant becomes uniform. The refrigerant mixed in the merging portion 30 is diverted to each flow path 28 located on the downstream side of the merging portion 30.

By mixing the refrigerants at the merging portion 30 in this way, development of a temperature boundary layer in the refrigerant is suppressed. By suppressing the development of the temperature boundary layer, the temperature deviation of the cooling member 4, particularly the temperature deviation in the direction in which the refrigerant flows can be reduced, and therefore the temperature deviation in each battery 6 can be reduced.

The contact area between the refrigerant and the plate-shaped portion 26 is smaller at the merging portion 30 than at the region where the plurality of flow paths 28 extend. Therefore, the cooling member 4 has a reduced heat exchange efficiency with the assembly 2 at the merging portion 30. Therefore, it is preferable that the merging portions 30 are arranged in a small number on the upstream side of the flow paths 28 and in a large number on the downstream side. As a result, on the upstream side where the refrigerant temperature in the cross-sectional direction of the flow path (the direction in which the cross section parallel to the YZ plane extends) is low as a whole, and heat exchange between the assembly 2 and the refrigerant is smoothly performed, it is possible to suppress a decrease in cooling efficiency due to a decrease in contact area between the refrigerant and the plate-shaped portion 26. On the other hand, on the downstream side where the refrigerant temperature in the cross-sectional direction of the flow path tends to increase as a whole and the heat exchange tends to be hindered, the number of times the refrigerant is mixed at the merging portion 30 is increased so that the relatively high temperature refrigerant located on the wall surface side of the flow path 28 and the relatively low temperature refrigerant located on the center side of the flow path 28 are positively mixed. As a result, the refrigerant temperature is averaged between the wall surface side and the center side of the flow path 28, and overheating of the refrigerant on the wall surface side of the flow path 28 is suppressed. As a result, heat exchange between the assembly 2 and the refrigerant can be promoted.

The merging portion 30 includes at least one flow blocking portion 32 that disturbs the flow of the refrigerant. The flow blocking portion 32 includes a side wall extending from one plate portion of the first plate portion 26a and the second plate portion 26b toward the other plate portion within the merging portion 30. The side wall forming the flow blocking portion 32 has a collision surface on which the refrigerant flowing through the merging portion 30 hits. The collision surface extends in a direction intersecting the direction from an inlet 30a to an outlet 30b of the refrigerant (the direction X in the present embodiment) in the merging portion 30. The collision surface preferably has a curved surface shape. Further, the flow blocking portion 32 may be cylindrical or columnar, and in this case, the side wall is formed by the peripheral surface of the flow blocking portion 32. The refrigerant that has flowed from each flow path 28 into the merging portion 30 hits the flow blocking portion 32 to promote mixing. As a result, the development of the temperature boundary layer can be further suppressed.

In the present embodiment, some of the flow blocking portions 32 are each formed by a columnar boss 34 that protrudes in the direction Z at the merging portion 30 and extends from the first plate portion 26a to the second plate portion 26b. Therefore, the peripheral surface of the boss 34 corresponds to the side wall of the flow blocking portion 32. Further, the region of the peripheral surface of the boss 34 facing the inlet 30a side of the merging portion 30 corresponds to a curved collision surface extending in the direction intersecting the direction X.

In addition, some of the other flow blocking portions 32 are each formed by a cylindrical insertion portion 38 into which the fastening member 36 is inserted. The insertion portion 38 is a recess provided in the second plate portion 26b and protruding toward the first plate portion 26a. The insertion portion 38 may be provided in the first plate portion 26a and protrude toward the second plate portion 26b. That is, the flow blocking portion 32 can be formed by a recess provided in one plate portion and protruding toward the other plate portion. In this case, the peripheral surface of the insertion portion 38 corresponds to the side wall of the flow blocking portion 32. Further, the region of the peripheral surface of the insertion portion 38 facing the inlet 30a of the merging portion 30 corresponds to a curved collision surface extending in the direction intersecting the direction X.

Since the flow blocking portion 32 has a curved collision surface, the refrigerant that hits the collision surface can be smoothly flowed to the downstream side of the flow blocking portion 32. Further, by forming the wall surface of the flow blocking portion 32 with the peripheral surface of the boss 34 or the insertion portion 38, it is possible to form a refrigerant flow flowing to the back side of the flow blocking portion 32, and the refrigerant can be more agitated.

The insertion portion 38 has a bottomed tubular shape, and has a bottom portion 38a connected to the other plate portion, that is, the first plate portion 26a in the present embodiment. The bottom portion 38a is joined to the other plate portion by, for example, brazing. The cooling member 4 has a through hole 40 that penetrates the bottom portion 38a and the other plate portion. The fastening member 36 is inserted through the through hole 40. With this configuration, the flow blocking portion 32 can have a function of fixing the cooling member 4 to the assembly 2 or a function of fixing the cooling member 4 to the module case. When the assembly 2 is fixed to the cooling member 4 by fastening the fastening member 36 to the insertion portion 38, the fastening member 36 is connected to, for example, the end plate 10 or the restraining member 12.

In the present embodiment, the plurality of flow blocking portions 32 are arranged at predetermined intervals along the direction intersecting the direction from the inlet 30a to the outlet 30b of the refrigerant in the merging portion 30, in other words, along the extending direction of the merging portion 30. As a result, the refrigerant flowing from each flow path 28 into the merging portion 30 can be mixed more evenly.

The flow blocking portion 32 blocks the flow of the refrigerant. Therefore, it is preferable that the flow blocking portions 32 are provided in a small number in the merging portion 30 arranged on the upstream side of the refrigerant flow and in a large number in the merging portion 30 arranged on the downstream side. As a result, it is possible to prevent the flow of the refrigerant from being blocked on the upstream side where the refrigerant temperature in the cross-sectional direction of the flow path is low as a whole and the heat exchange between the assembly 2 and the refrigerant smoothly occurs. On the other hand, on the downstream side where the refrigerant temperature in the cross-sectional direction of the flow path tends to increase as a whole and the heat exchange tends to be hindered, the refrigerant is mixed more, and the refrigerant temperature is averaged through mixing of the relatively high temperature refrigerant and the relatively low temperature refrigerant, so that the heat exchange between the assembly 2 and the refrigerant can be promoted.

The flow blocking portion 32 may be arranged on the upstream side in the merging portion 30, may be arranged on the middle flow side, or may be arranged on the downstream side. Further, in the plurality of merging portions 30 arranged in the upstream-downstream direction of the flow paths 28, the flow blocking portions 32 may be arranged so as to shift in the direction intersecting the upstream-downstream direction. For example, the flow blocking portions 32 are arranged in a staggered pattern on the XY plane. As a result, the refrigerant can be mixed more uniformly in the entire cooling member 4.

Figure 6:
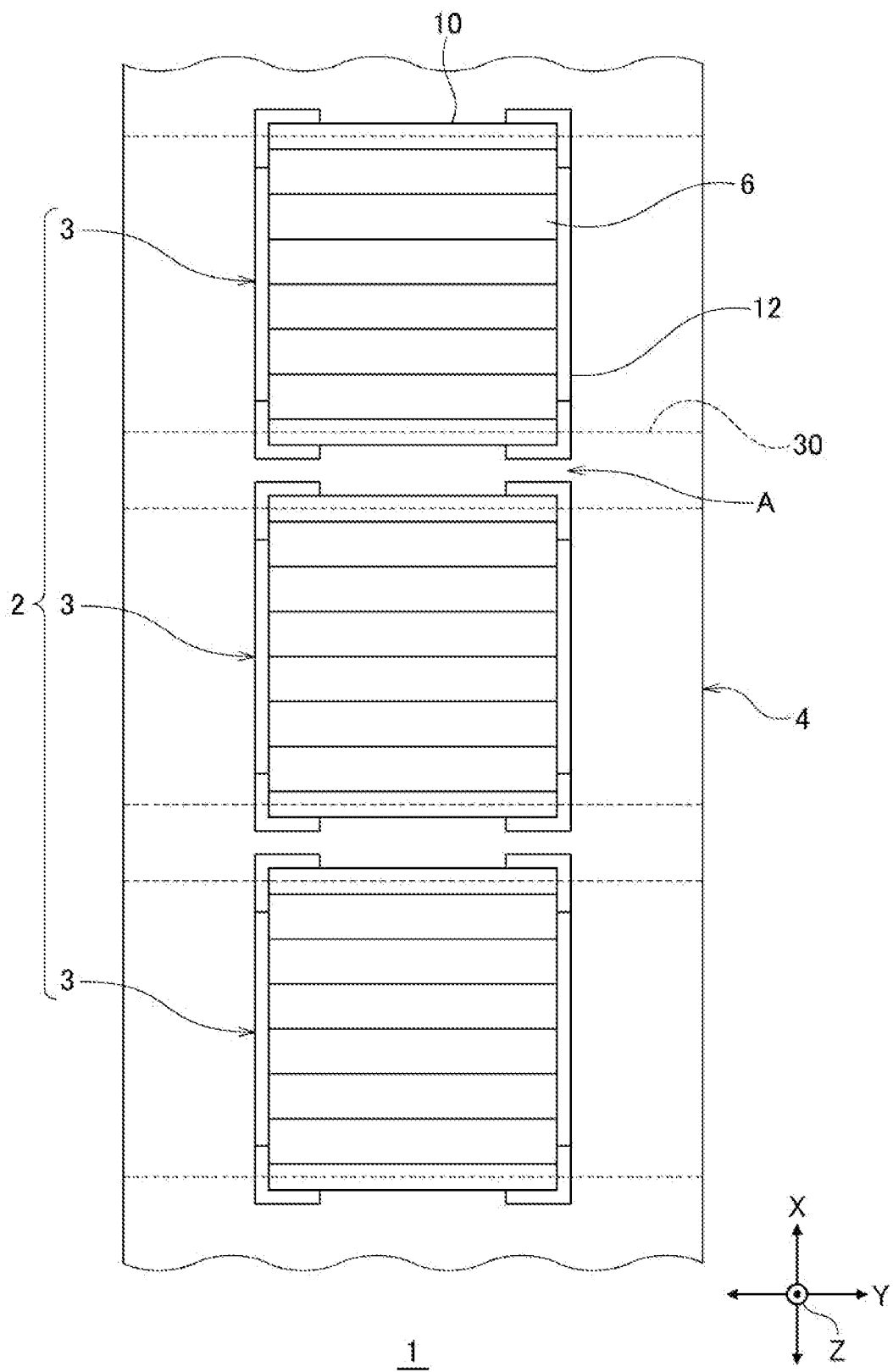
FIG. 6 is a plan view schematically illustrating the structure of the battery module.

Further, at least some of the merging portions 30 are arranged as follows. FIG. 6 is a plan view schematically illustrating the structure of the battery module 1. In FIG. 6, only a part of the battery module 1 is illustrated, and the illustration of the assembly 2 is simplified.

That is, at least a part of the merging portion 30 is provided at a position that does not overlap with the battery 6 when viewed from the direction in which the assembly 2 and the cooling member 4 are aligned (the direction Z in the present embodiment). As the position that does not overlap with the battery 6, in other words, the position that avoids the battery 6, there are given a position that overlaps with a gap A between the adjacent battery groups 3, a position that overlaps with the end plate 10, and a position that overlaps with the restraining member 12, when viewed from the direction in which the assembly 2 and the cooling member 4 are aligned. In the present embodiment, the merging portions 30 are mainly provided at the positions that overlap with the gap A between the adjacent battery groups 3 and the position that overlaps with the end plate 10.

As described above, the cooling member 4 has a reduced heat exchange efficiency with the assembly 2 at the merging portion 30. Therefore, by separating the merging portions 30 from the batteries 6 which are the main heat generating sources, it is possible to suppress a decrease in the cooling efficiency of the assembly 2.

As described above, the battery module 1 according to the present embodiment includes the assembly 2 of the plurality of batteries 6 and the cooling member 4 arranged so as to be heat exchangeable with the assembly 2. The cooling member 4 has the hollow portion 27 through which the refrigerant flows. The hollow portion 27 includes the branch portions 29 each including the plurality of flow paths 28, and the merging portions 30 which are each a space where the plurality of flow paths are merged.

As described above, in the present embodiment, the merging portions 30 are provided in the middle of the flow paths 28, and the development of the temperature boundary layer is suppressed by mixing the refrigerant in the merging portions 30. Therefore, unlike the case where large cross-sectional area portions are provided in the flow path as in the conventional battery module, it is possible to avoid an increase in the size of the flow path. Therefore, according to the present embodiment, it is possible to make the cooling of the assembly 2 uniform while avoiding the increase in size of the battery module 1. Further, the uniform cooling of the assembly 2 can suppress the deterioration of the performance of the battery module 1. Further, as compared with the conventional case where the flow velocity of the refrigerant is increased or decreased to suppress the development of the temperature boundary layer, the development of the temperature boundary layer can be efficiently suppressed with a simpler structure.

Further, at least a part of the merging portion 30 is provided at a position that does not overlap with the battery 6 when viewed from the direction in which the assembly 2 and the cooling member 4 are aligned. Further, the merging portion 30 is provided at a position that overlaps with the gap between the adjacent battery groups 3, the end plate 10, or the restraining members 12 when viewed from the direction in which the assembly 2 and the cooling member 4 are aligned. As a result, the influence of the decrease in heat exchange efficiency in the merging portion 30 on the battery 6 can be reduced, so that the cooling efficiency of the assembly 2 can be further improved.

Further, the merging portion 30 includes the flow blocking portion 32 that disturbs the flow of the refrigerant. As a result, the development of the temperature boundary layer can be further suppressed, so that the assembly 2 can be cooled more uniformly. Further, the flow blocking portions 32 include, for example, the insertion portion 38 for the fastening member 36 for fixing the assembly 2 and the cooling member 4. In this way, by allowing the fastening structure of the assembly 2 and the cooling member 4 or the fastening structure of the cooling member 4 and the module case to function as the flow blocking portion 32, the structure can be simplified and downsized as compared with a cooling member provided with a fastening mechanism with another member outside the hollow portion 27. Therefore, the structure of the battery module 1 can be simplified.

Further, the cooling member 4 of the present embodiment is a flat plate-shaped pipe, and includes the first plate portion 26a facing the assembly 2 and the second plate portion 26b on the side opposite to the first plate portion 26a. The flow blocking portion 32 includes the side wall extending from one plate portion toward the other plate portion within the merging portion 30. The side wall has the collision surface on which the refrigerant flowing through the merging portion 30 hits. The collision surface extends in the direction intersecting the direction from the inlet 30a to the outlet 30b of the refrigerant in the merging portion 30. Further, the collision surface has a curved surface shape. Further, the flow blocking portion 32 is cylindrical or columnar, and the side wall is formed by the peripheral surface of the flow blocking portion 32.

Further, the plurality of flow blocking portions 32 are arranged at predetermined intervals along the direction intersecting the direction from the inlet 30a to the outlet 30b of the refrigerant in the merging portion 30. Further, some of the flow blocking portions 32 are each a recess provided in one plate portion of the first plate portion and the second plate portion and protruding toward the other plate portion. According to this configuration, it is considered that the formation of the flow blocking portion becomes easier as compared with a flow blocking portion formed by a pillar or a protrusion filled with a metal material inside. In addition, the weight of the flow blocking portion can be reduced, and therefore the weight of the battery module 1 can be reduced.

The recess has a bottomed tubular shape, and the bottom portion 38a is connected to the other plate portion. The cooling member 4 has the through hole 40 that penetrates the bottom portion 38a and the other plate portion. Further, the first plate portion 26a and the second plate portion 26b face each other with a predetermined gap, and the hollow portion 27 is arranged in the gap between the two plate portions. Further, the hollow portion 27 includes the plurality of branch portions 29 arranged from the upstream side to the downstream side of the refrigerant flow, and the merging portions 30 are each interposed between two adjacent branch portions 29.

The embodiment of the present disclosure has been described in detail above. The above-described embodiment merely shows a specific example in carrying out the present disclosure. The content of the embodiment does not limit the technical scope of the present disclosure, and many designs such as modification, addition, and deletion of components can be made without departing from the ideas of the present disclosure defined in the claims. A new embodiment with the design change has the effects of the combined embodiment and the modification. In the above-described embodiment, the contents that can be changed in design are emphasized by adding notations such as "of the present embodiment" or "in the present embodiment", but design changes are allowed even in contents without such notations. Any combination of the above components is also effective as an aspect of the present disclosure. The hatching attached to the cross section of the drawing does not limit the material to which the hatching is attached.

In the first embodiment, the battery 6 is a square battery, but the shape of the battery 6 is not particularly limited and may be cylindrical or the like. Further, the numbers of the batteries 6 and the battery groups 3 included in the assembly 2 are not particularly limited. The flow paths 28 extend along the direction X, but the direction is not particularly limited. Further, the assembly 2 and the cooling member 4 may be held in direct abutment on each other. The structure of each part of the assembly 2 including the shape of the separator 8 and the fastening structure between the end plate 10 and the restraining member 12 is not particularly limited. Further, all of the plurality of flow paths 28 may not be merged at the merging portion 30. If at least two flow paths 28 are connected at the merging portion 30, the development of the temperature boundary layer can be suppressed in these two flow paths 28.

Second Embodiment

Figure 7:
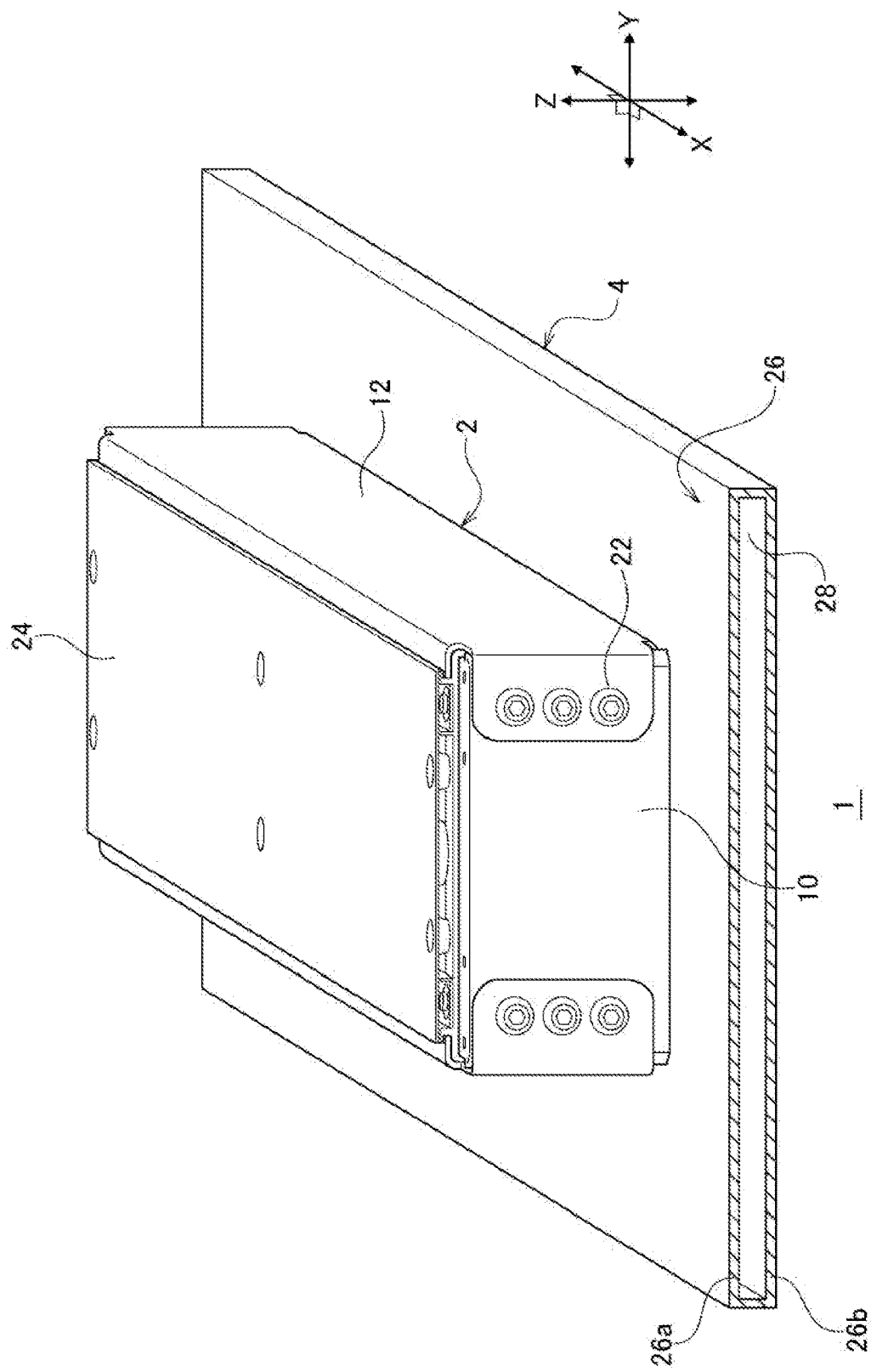
FIG. 7 is a perspective view of a battery module according to a second embodiment.
Figure 8:
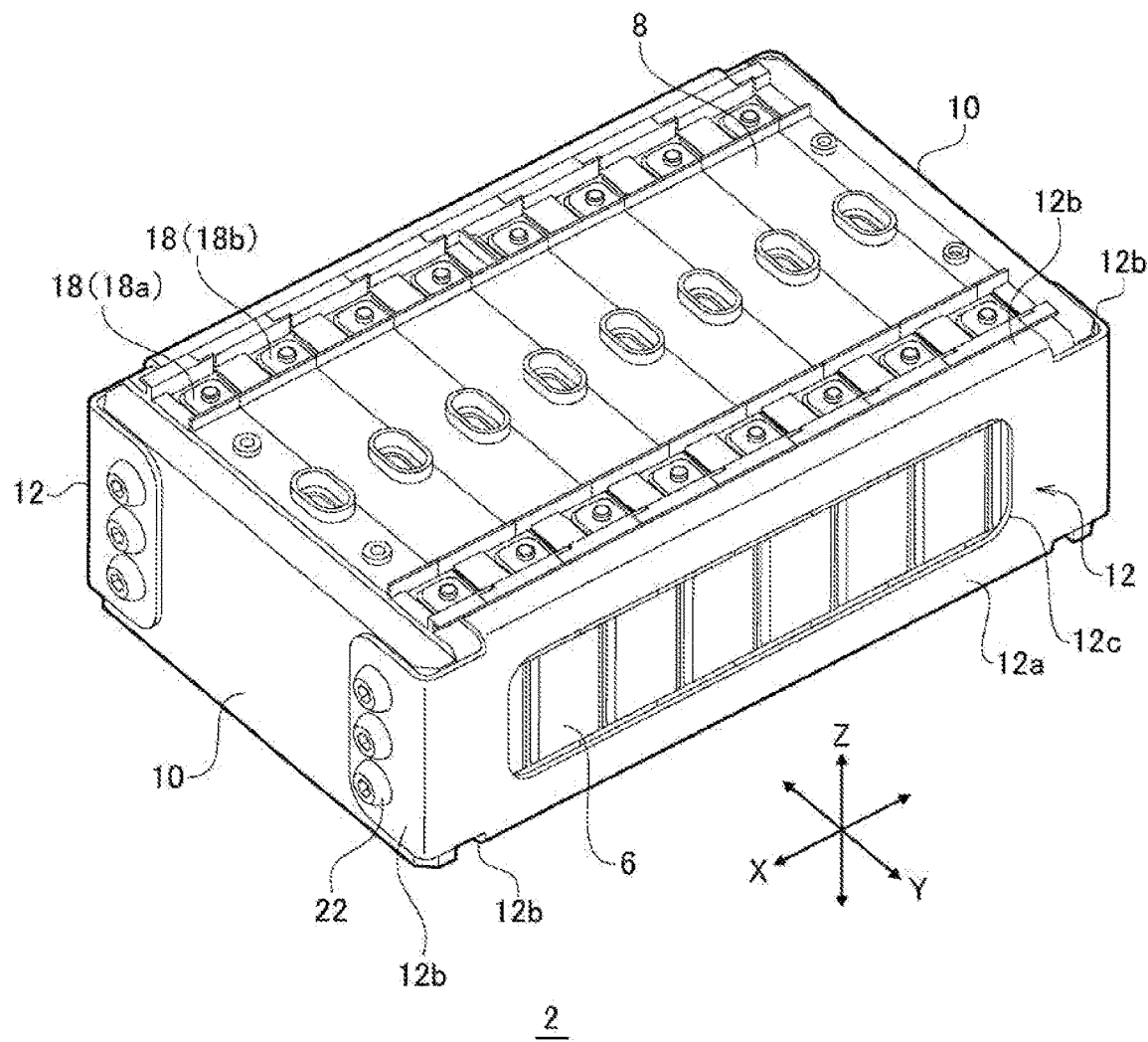
FIG. 8 is a perspective view of an assembly.
Figure 9:
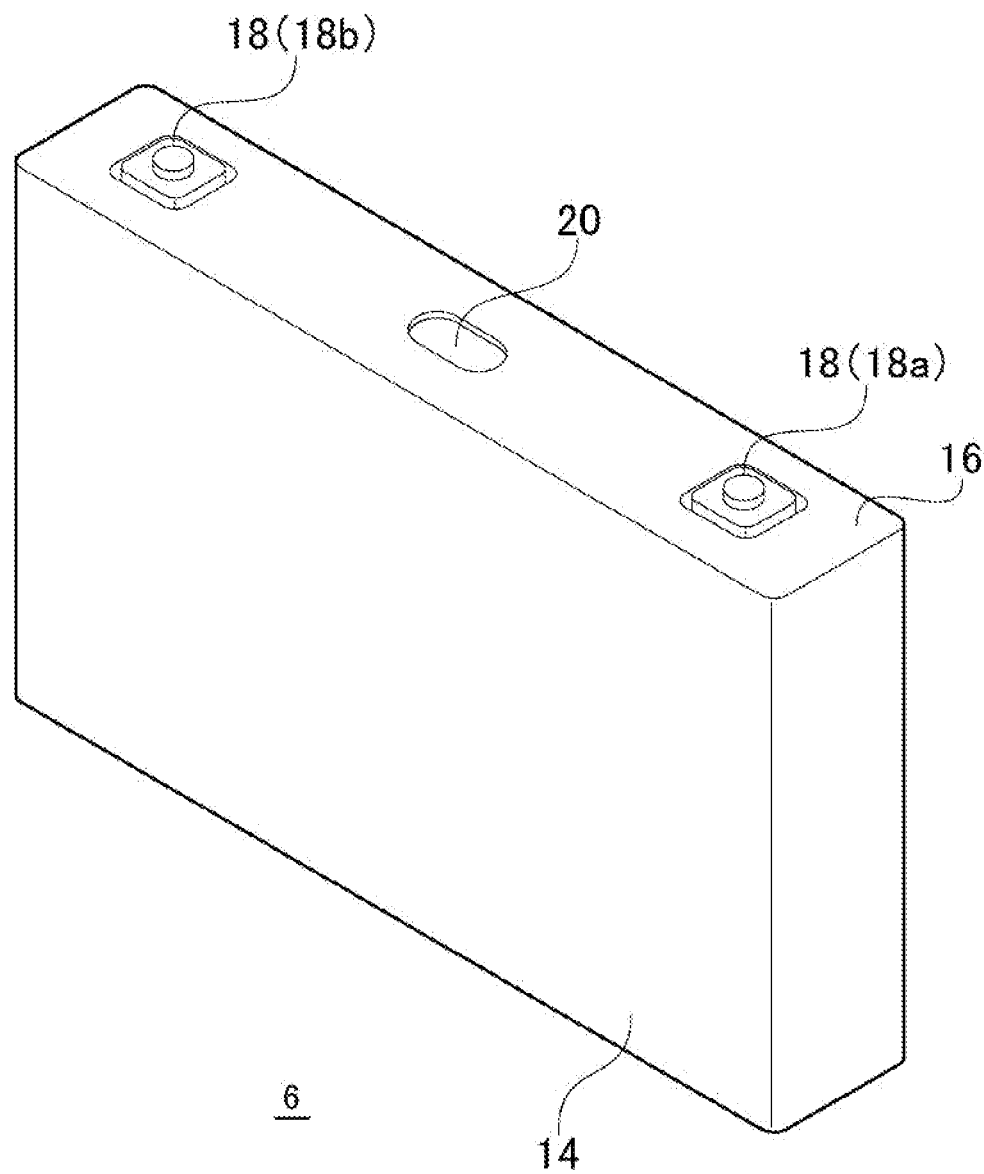
FIG. 9 is a perspective view of a battery.

FIG. 7 is a perspective view of a battery module according to a second embodiment. FIG. 8 is a perspective view of an assembly. FIG. 9 is a perspective view of a battery. In FIG. 7, only a part of a cooling member is illustrated. Further, in FIG. 8, illustration of a cover member is omitted. The battery module 1 includes an assembly 2 and a cooling member 4.

The assembly 2 has a structure in which a plurality of batteries 6 are assembled. The assembly 2 of the present embodiment takes the form of a battery group in which a plurality of flat batteries 6 are stacked. The assembly 2 includes a plurality of batteries 6, a plurality of separators 8, a pair of end plates 10, and a pair of restraining members 12.

Each battery 6 is a rechargeable secondary battery such as a lithium ion battery, a nickel-hydrogen battery, or a nickel-cadmium battery. The battery 6 is a so-called square battery, and has a flat rectangular parallelepiped outer can 14. A substantially rectangular opening (not shown) is provided on one surface of the outer can 14, and an electrode body, an electrolytic solution, or the like is accommodated in the outer can 14 through this opening. A sealing plate 16 for sealing the outer can 14 is provided at the opening of the outer can 14. The sealing plate 16 is, for example, a rectangular plate.

The sealing plate 16 is provided with a positive electrode output terminal 18 near one end in the longitudinal direction and a negative electrode output terminal 18 near the other end. The pair of output terminals 18 are electrically connected to a positive electrode plate and a negative electrode plate constituting the electrode body, respectively. Hereinafter, as appropriate, the positive electrode output terminal 18 will be referred to as a positive electrode terminal 18a, and the negative electrode output terminal 18 will be referred to as a negative electrode terminal 18b. Further, when it is not necessary to distinguish the polarity of the output terminal 18, the positive electrode terminal 18a and the negative electrode terminal 18b are collectively referred to as output terminals 18. The outer can 14 and the sealing plate 16 are conductors, for example, made of metal. For example, the outer can 14 and the sealing plate 16 are made of aluminum, iron, stainless steel, or the like. The sealing plate 16 and the opening of the outer can 14 are joined by, for example, a laser. Each of the pair of output terminals 18 is inserted into a through hole (not shown) formed in the sealing plate 16. An insulating sealing member (not shown) is interposed between each of the pair of output terminals 18 and each through hole.

In the description of the present embodiment, for convenience, the surface on the side where the sealing plate 16 is provided is the upper surface of the battery 6, and the surface on the opposite side (the bottom surface of the outer can 14) is the bottom surface of the battery 6. Further, the battery 6 has four side surfaces connecting the upper surface and the bottom surface. Two of the four side surfaces are a pair of long side surfaces connected to the long sides of the top and bottom. The long side surfaces are the surfaces having the largest area among the six surfaces of the battery 6. The remaining two side surfaces, excluding the two long side surfaces, are a pair of short side surfaces connected to the short sides of the top and bottom. Further, in the assembly 2, the surface on the upper surface side of the battery 6 is the upper surface of the assembly 2, the surface on the bottom surface side of the battery 6 is the bottom surface of the assembly 2, and the surfaces on the short side surface sides of the battery 6 are the side surfaces of the assembly 2. Further, the upper surface side of the assembly 2 is an upper side in the vertical direction, and the bottom surface side of the assembly 2 is a lower side in the vertical direction. These directions and positions are defined for convenience. Therefore, for example, it does not mean that the portion defined as the upper surface in the present disclosure is always located above the portion defined as the bottom surface.

A safety valve 20 is provided between the pair of output terminals 18 on the sealing plate 16. The safety valve 20 is structured to open when the internal pressure of the outer can 14 rises above a predetermined value to release the gas inside. The safety valve 20 of each battery 6 is connected to a gas duct (not shown), and the gas inside the battery is discharged from the safety valve 20 to the gas duct. The safety valve 20 may be formed by, for example, a thin-walled portion provided in a part of the sealing plate 16 and thinner than the other portion, and a linear groove formed on the surface of the thin-walled portion. In this configuration, when the internal pressure of the outer can 14 rises, the thin-walled portion is torn from the groove to open the valve.

Further, the plurality of batteries 6 are arranged side by side at predetermined intervals so that the long side surfaces of the adjacent batteries 6 face each other. In the present embodiment, the direction in which the plurality of batteries 6 are aligned is the direction X. Further, the output terminals 18 of each battery 6 are arranged so as to face the same direction. In the present embodiment, the output terminals 18 of each battery 6 are arranged so as to face the upper side in the vertical direction for convenience. The output terminals 18 of each battery 6 may be arranged so as to face different directions. The two adjacent batteries 6 are stacked so that the positive electrode terminal 18a of one battery 6 and the negative electrode terminal 18b of the other battery 6 are adjacent to each other. The positive electrode terminal 18a and the negative electrode terminal 18b are electrically connected via a bus bar (not shown). The output terminals 18 having the same polarity in the plurality of adjacent batteries 6 may be connected in parallel by a bus bar to form a battery block, and the battery blocks may be connected in series.

The separator 8 is also called an insulating spacer, and is made of, for example, a resin having an insulating property. The separator 8 is arranged between the two adjacent batteries 6 to electrically insulate the two batteries 6. Further, the separator 8 is further arranged between the battery 6 and the end plate 10 to insulate the battery 6 and the end plate 10. Examples of the resin constituting the separator 8 include thermoplastic resins such as polypropylene (PP), polybutylene terephthalate (PBT), polycarbonate (PC), and NORYL (registered trademark) resin (modified PPE).

Further, a part of the separator 8 extends in the direction X and covers the upper surface of the battery 6. As a result, it is possible to secure a creepage distance between the adjacent batteries 6 or between the battery 6 and the end plate 10. Further, the separator 8 has openings at positions corresponding to the output terminals 18 and the safety valve 20 so that each of them is exposed.

The plurality of batteries 6 and the plurality of separators 8 arranged side by side are sandwiched between the pair of end plates 10. The pair of end plates 10 are arranged so as to be adjacent to the batteries 6 located at both ends in the direction X via the separators 8. The end plate 10 is made of, for example, a metal plate. Screw holes (not shown) into which screws 22 are screwed are provided on the surface of the end plate 10 facing the long side surface of the battery 6.

The pair of restraining members 12 are also called bind bars, and are elongated members whose longitudinal direction is the direction X. The pair of restraining members 12 are arranged so as to face each other in the direction Y orthogonal to the direction X and parallel to the longitudinal direction of the sealing plate. The plurality of batteries 6, the plurality of separators 8, and the pair of end plates 10 are interposed between the pair of restraining members 12. Each restraining member 12 has a rectangular flat surface portion 12a extending parallel to the short side surface of the battery 6, and four eaves portions 12b protruding from end sides of the flat surface portion 12a toward the battery 6. The two eaves portions 12b facing each other in the direction X are provided with through holes (not shown) through which the screws 22 are inserted. The flat surface portion 12a is provided with an opening portion 12c that exposes the short side surfaces of the batteries 6.

The plurality of batteries 6 and the plurality of separators 8 are sandwiched in the direction Y by the pair of restraining members 12 under a state where these are alternately arranged and sandwiched in the direction X by the pair of end plates 10. Each restraining member 12 is aligned so that the through holes of the restraining member 12 overlaps with the screw holes of the end plate 10. Then, the screws 22 are inserted into the through holes and screwed into the screw holes. By engaging the pair of restraining members 12 with the pair of end plates 10 in this way, the plurality of batteries 6 are restrained.

The plurality of batteries 6 are tightened in the direction X by the restraining members 12, so that the plurality of batteries 6 are positioned in the direction X. Further, the bottom surfaces of the plurality of batteries 6 abut on the lower eaves portions 12b of the restraining members 12 via the separators 8, and the upper surfaces of the plurality of batteries 6 abut on the upper eaves portions 12b of the restraining members 12 via the separator 8, so that the plurality of batteries 6 are positioned in the up-down direction. As an example, after these positionings are completed, the bus bar is attached to the output terminals 18 of each battery 6, and the output terminals 18 are electrically connected.

The upper surface of the assembly 2 is covered with a cover member 24. The cover member 24 prevents the contact of condensed water, dust, etc. with the output terminals 18, the bus bar, the safety valves 20, etc. of the batteries 6. The cover member 24 is made of, for example, a resin having an insulating property. The cover member 24 is fixed to the upper surface of the assembly 2 by a well-known fixing structure (not shown) including screws and a well-known locking mechanism.

The cooling member 4 is arranged so as to be heat exchangeable with the assembly 2, and cools each battery 6. The cooling member 4 of the present embodiment is a plate-shaped cooling plate, and the assembly 2 is placed on the long side surface (or main surface) thereof. The assembly 2 is placed on the cooling member 4 so that the bottom surface faces the cooling member 4 side. At this time, the bottom surface of the battery 6 is thermally connected to the cooling member 4 via the eaves portions 12b of the restraining members 12. In order to further improve the heat exchange efficiency between the battery 6 and the cooling member 4, a resin sheet or the like having good thermal conductivity may be interposed between the portion of the bottom surface of the battery 6 that is exposed without being covered by the eaves portions 12b and the cooling member 4. Alternatively, the entire bottom surface of the battery 6 and the cooling member 4 may be brought into abutment on each other via the above-mentioned resin sheet without providing the eaves portions 12b located on the bottom surface side of the battery 6. In this case, the cooling member 4 takes on the function of the eaves portions 12b located on the bottom surface side of the battery 6.

The cooling member 4 includes a hollow plate-shaped portion 26 and a flow path 28 arranged inside the plate-shaped portion 26 through which the refrigerant flows. In the present embodiment, one flow path 28 is provided inside the plate-shaped portion 26. The flow path 28 is arranged so as to extend in the direction X. A refrigerant supply path (not shown) is connected to one end of the flow path 28 in the direction X, and a refrigerant discharge path (not shown) is connected to the other end. Therefore, one end side of the flow path 28 is upstream of the refrigerant flow, and the other end side is downstream of the refrigerant flow. The cooling member 4 may include a plurality of flow paths 28. In this case, the plurality of flow paths 28 each extend in the direction X and are arranged in the horizontal direction Y.

That is, the cooling member 4 of the present embodiment is a flat plate-shaped pipe. The plate-shaped portion 26 includes a first plate portion 26a facing the assembly 2 and a second plate portion 26b the side opposite to the first plate portion 26a. The first plate portion 26a and the second plate portion 26b face each other with a predetermined gap. The flow path 28 is arranged in this gap. Such a cooling member 4 can be formed by combining conventionally known methods such as extrusion molding.

The cooling member 4 may be formed by joining the first plate portion 26a and the second plate portion 26b, which are separate bodies from each other. For example, by joining a first plate material having outer walls erected on both end sides in the direction Y and a second plate material having protruding portions 132 described later on the main surface by brazing or the like, the cooling member 4 including the flow path 28 between the first plate portion 26a and the second plate portion 26b can be obtained. The joining positions between the first plate material and the second plate material are, for example, positions where the tips of the outer walls and the end sides of the second plate material come into contact with each other. In this case, the cooling member 4 can be easily manufactured as compared with the case where the flow path 28 is formed by hollowing out a solid plate material or the case of performing extrusion molding. The outer walls and the protruding portions 132 may be provided on the same plate material.

The plate-shaped portion 26 is made of a material having high thermal conductivity such as aluminum. The assembly 2 is placed on the plate-shaped portion 26, for example, via the above-mentioned resin sheet having an insulating property and thermal conductivity. Each battery 6 exchanges heat with refrigerant such as water or ethylene glycol flowing through the flow paths 28 via the resin sheet and the plate-shaped portion 26. As a result, each battery 6 is cooled. The plate-shaped portion 26 has an insertion portion 144 into which a fastening member 142 such as a screw is inserted at a predetermined position (see FIG. 12(A)). The assembly 2 and the cooling member 4 are fixed to each other by inserting the fastening member 142 through the insertion portion 144. The insertion portion 144 is arranged in a floating island shape in the flow path 28. The fastening member 142 may be used not only for fixing the assembly 2 and the cooling member 4, but also for fixing the cooling member 4 to a module case. Further, the insertion portion 144 is preferably provided at a position that does not overlap with the battery 6 when viewed from the direction Z in which the assembly 2 and the cooling member 4 are aligned. Further, when the assembly 2 is fixed to the cooling member 4 by fastening the fastening member 142 to the insertion portion 144, the fastening member 142 is connected to, for example, the end plate 10 or the restraining member 12.

Figure 10:
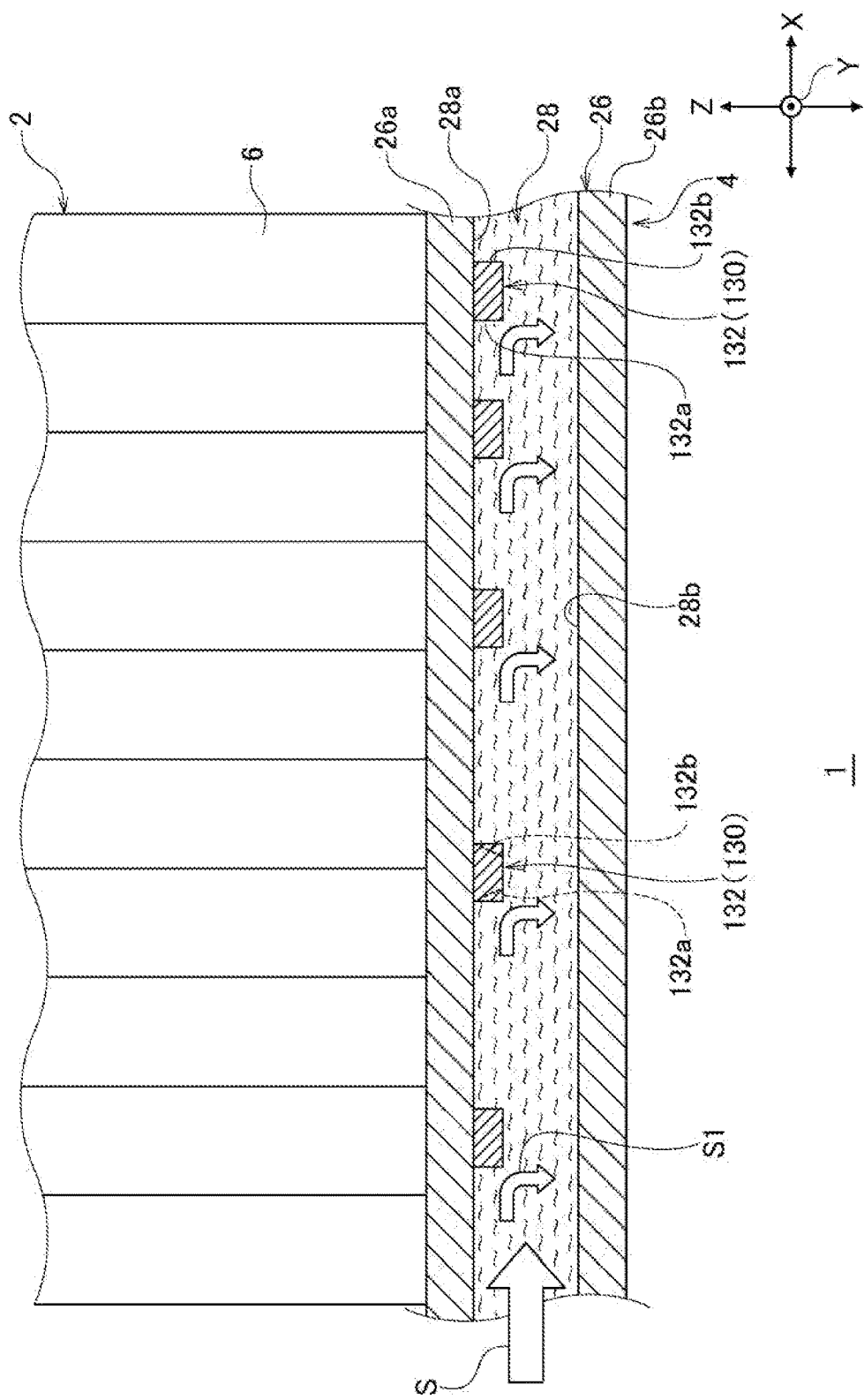
FIG. 10 is an end view schematically illustrating the structure of a cooling member.

Subsequently, the structure of the cooling member 4 will be described in more detail. FIG. 10 is an end view schematically illustrating the structure of the cooling member 4. In FIG. 10, the end face of the cooling member 4 cut along the plane extending in the direction X and the direction Z (the upper surface-bottom surface direction of the battery 6), that is, the XZ plane is illustrated. Further, only a part of the cooling member 4 is illustrated, and the illustration of the assembly 2 is simplified.

The cooling member 4 includes mixing portions 130 arranged in the middle of the flow path 28. The mixing portions 130 disturb the flow of at least part of the refrigerant to generate refrigerant flows in a direction approaching or separating from the assembly 2 in the direction Z in which the assembly 2 and the cooling member 4 are aligned. In the following, the flow of the refrigerant from the upstream side to the downstream side of the flow path 28 will be referred to as a main flow S, and the flow of the refrigerant in the direction of approaching/separating from the assembly 2 will be referred to as a turbulent flow S1.

The mixing portions 130 of the present embodiment are each formed by the protruding portion 132 arranged on a first wall surface 28a located on the assembly 2 side of the inner wall surfaces of the flow path 28. The first wall surface 28a is a surface that defines the flow path 28 in the surface of the first plate portion 26a. The protruding portion 132 protrudes from the first wall surface 28a toward the center side of the flow path 28, that is, in the direction separating from the assembly 2. Therefore, when the main flow S of the refrigerant hits the protruding portion 132, part of the main flow S becomes the turbulent flow S1 traveling in the direction separating from the assembly 2. In other words, the main flow S of the refrigerant travels downstream in the flow path 28, and part of the flow is changed in direction to the up-down direction by the protruding portion 132.

Thus, refrigerant located on the first wall surface 28a side and having been subjected to heat exchange with the assembly 2 and refrigerant located on the center side of the flow path 28 and not having been subjected to heat exchange with the assembly 2 are mixed. As a result, the development of the temperature boundary layer is suppressed. By suppressing the development of the temperature boundary layer, the temperature deviation of the cooling member 4, particularly the temperature deviation in the direction in which the refrigerant flows can be reduced, and therefore the temperature deviation in each battery 6 can be reduced.

The cooling member 4 has a gap between the protruding portions 132 and the second wall surface 28b facing the first wall surface 28a of the inner wall surfaces of the flow path 28. That is, the protruding portions 132 protruding from the first plate portion 26a do not abut on the second plate portion 26b. As a result, it is possible to prevent the flow of the refrigerant from being blocked by the protruding portions 132 while generating the turbulent flows S1. The second wall surface 28b is a surface that defines the flow path 28 in the surface of the second plate portion 26b.

As indicated by the broken line in FIG. 10, the protruding portion 132 may be inclined so that a front surface 132a facing the upstream side of the flow path 28 or the main flow S extends toward the downstream side as it approaches the tip of the protruding portion 132 in the protruding direction. As a result, it is possible to prevent the flow of the refrigerant from being blocked while generating the turbulent flows S1. Further, the protruding portion 132 may be inclined so that a rear surface 132b facing the downstream side of the flow path 28 or the main flow S extends toward the upstream side as it approaches the tip of the protruding portion 132 in the protruding direction. As a result, the refrigerant can easily flow to the corner formed by the rear surface 132b and the first wall surface 28a. Therefore, the heat exchange between the assembly 2 and the refrigerant can be promoted.

The protruding portions 132 may be provided on the second wall surface 28b facing the first wall surface 28a, that is, on the second wall surface 28b located on the side opposite to the assembly 2. In this case, when the main flow S hits the protruding portion 132, part of the main flow S becomes the turbulent flow S1 traveling in the direction approaching the assembly 2. Also in this case, the refrigerant located on the first wall surface 28a side and having been subjected to heat exchange with the assembly 2 and the refrigerant located on the center side of the flow path 28 and not having been subjected to heat exchange with the assembly 2 can be mixed.

The protruding portions 132 slightly block the flow of the refrigerant. Therefore, it is preferable that the protruding portions 132 are arranged in a small number on the upstream side of the main flow S and in a large number on the downstream side. As a result, it is possible to prevent the flow of the refrigerant from being blocked on the upstream side where the heat exchange between the assembly 2 and the refrigerant smoothly occurs because the refrigerant temperature is low as a whole. On the other hand, on the downstream side where the refrigerant temperature in the flow-path cross section perpendicular to the direction in which the main flow S flows tends to increase as a whole and the heat exchange tends to be hindered, the refrigerant temperature in the flow-path cross section is averaged by generating a larger number of turbulent flows S1. As a result, the temperature of the refrigerant on the first wall surface 28a side can be lowered, and the heat exchange between the assembly 2 and the refrigerant can be promoted.

Figure 11:
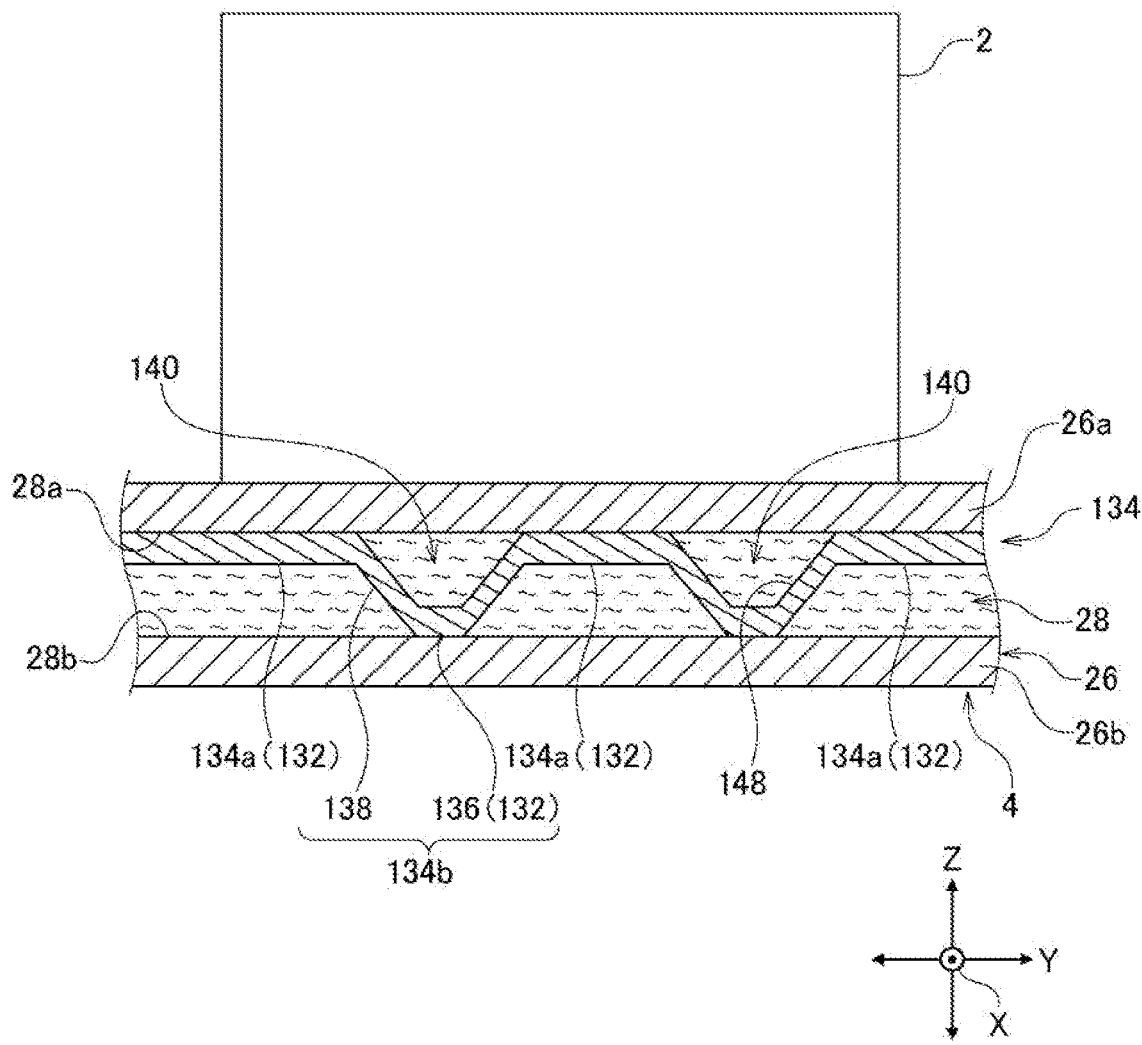
FIG. 11 is an end view schematically illustrating the structure of the cooling member.

The protruding portions 132 of the present embodiment are each formed by a part of a band-shaped member described below. FIG. 11 is an end view schematically illustrating the structure of the cooling member 4. In FIG. 11, the end face of the cooling member 4 cut along the plane extending in the direction Y and the direction Z, that is, the YZ plane is illustrated. Further, only a part of the cooling member 4 is illustrated, and the illustration of the assembly 2 is simplified.

The cooling member 4 has band-shaped members 134 extending in the flow path 28 in a direction intersecting the extending direction of the flow path 28 (the direction Y in the present embodiment). In the present embodiment, the plurality of band-shaped members 134 are arranged at predetermined intervals in the upstream and downstream direction of the flow path 28. Each band-shaped member 134 has a plurality of first portions 134a and second portions 134b. Each first portion 134a is in contact with the first wall surface 28a and forms the protruding portion 132. Therefore, the protruding portion 132 of the present embodiment has an elongated shape that is long in the direction Y intersecting the flow path 28 and the direction parallel to the first wall surface 28a. This makes it possible to agitate more refrigerant.

The second portion 134b protrudes between the adjacent first portions 134a toward the second wall surface 28b facing the first wall surface 28a, and has a tip portion 136 which abuts on the second wall surface 28b. The band-shaped member 134 is fixed in the flow path 28 by the first portions 134a abutting on the first wall surface 28a and the tip portions 136 of the second portion 134b abutting on the second wall surface 28b. Therefore, the second portion 134b constitutes a support portion for fixing the protruding portion 132 in the flow path 28. The tip portion 136 of the second portion 134b also functions as the protruding portion 132 protruding from the second wall surface 28b.

The second portion 134b has a pair of side walls 138 each connecting the first portions 134a and the tip portion 136. Each side wall 138 extends diagonally from the first wall surface 28a toward the second wall surface 28b. That is, the side wall 138 extends so as to shift in the direction Y as it approaches the second wall surface 28b. By inclining the side wall 138 in this way, the band-shaped member 134 easily bends in the direction in which the first portion 134a and the tip portion 136 approach/separate from each other. As a result, the dimensional tolerance of the band-shaped member 134 can be absorbed, and the band-shaped member 134 can be securely fixed by the flow path 28.

Figure 12A:
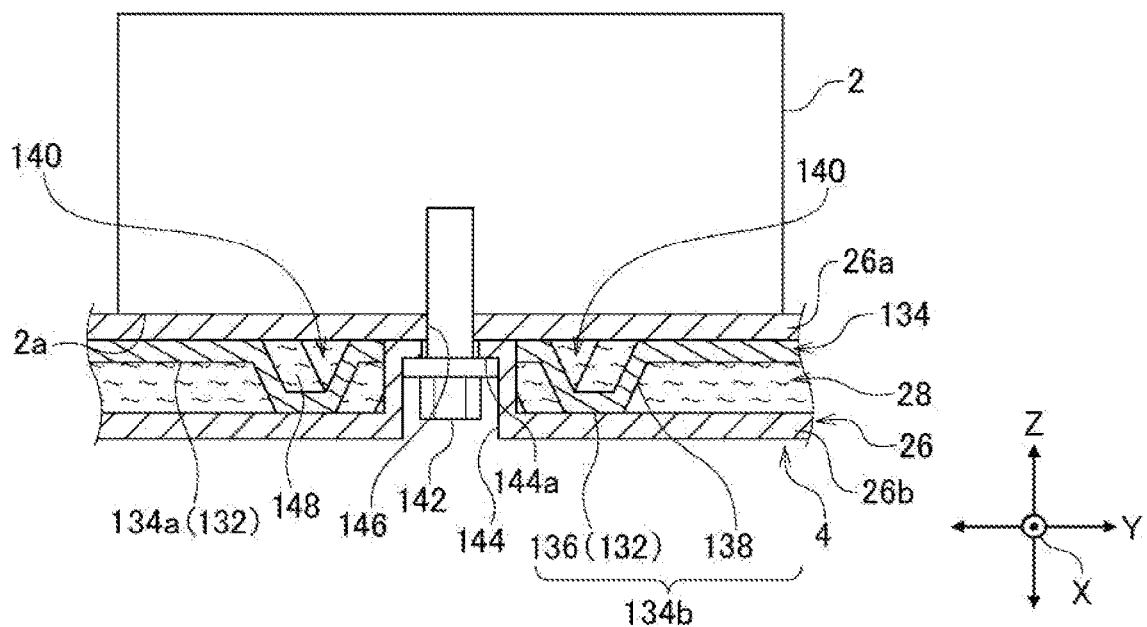
FIG. 12A is a cross-sectional view schematically illustrating the structure of the cooling member.
Figure 12B:
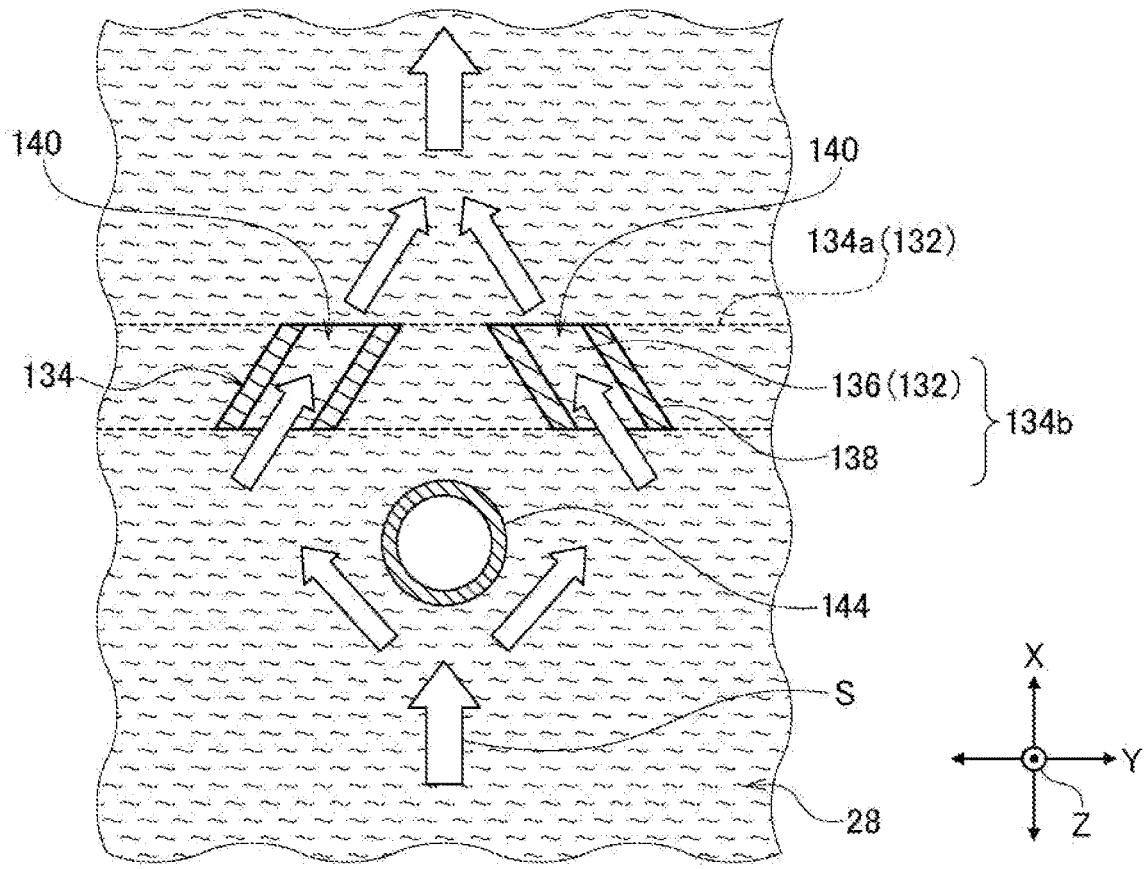
FIG. 12B is a schematic view for explaining the operation of fine flow paths.

Further, the cooling member 4 has fine flow paths 140. FIG. 12(A) is a cross-sectional view schematically illustrating the structure of the cooling member 4. FIG. 12(B) is a schematic view for explaining the operation of the fine flow paths 140. In FIG. 12(A), a cross section of the cooling member 4 along the YZ plane is illustrated. In FIG. 12(B), a cross section of the cooling member 4 along the plane extending in the direction X and the direction Y, that is, the XY plane is illustrated. Further, in FIGS. 12(A) and 12(B), only a part of the cooling member 4 is illustrated. Further, in FIG. 12(A), the illustration of the assembly 2 is simplified.

The fine flow paths 140 are arranged in the flow path 28. The fine flow paths 140 extend diagonally so as to shift in the direction intersecting the flow path 28, that is, the direction intersecting the direction X and the direction parallel to the first wall surface 28a as they advance from the upstream side to the downstream side of the flow path 28. In the present embodiment, the fine flow paths 140 extend diagonally so as to shift in the direction Y as they advance in the direction X.

The fine flow paths 140 of the present embodiment are each formed by a groove portion 148 provided in the second portion 134b. The groove portion 148 extends so as to shift in the direction intersecting the flow path 28 and the direction parallel to the first wall surface 28a as it advances from the upstream side to the downstream side of the flow path 28, and opens to the first wall surface 28a side. Specifically, the tip portion 136 of the second portion 134b is connected to the first portion 134a by the pair of side walls 138. The pair of side walls 138 are arranged in the extending direction of the band-shaped member 134. Further, the pair of side walls 138 extend diagonally so as to shift in the direction intersecting the flow path 28 and the direction parallel to the first wall surface 28a as they advance from the upstream side to the downstream side of the flow path 28. That is, the side walls 138 extend so as to shift in the direction Y as they advance in the direction X. The groove portion 148 is formed by the tip portion 136 and the pair of side walls 138. The groove portion 148 opens to the first wall surface 28a side. This opening is closed by the first wall surface 28a. Therefore, the fine flow path 140 is partitioned by the tip portion 136, the pair of side walls 138, and the first wall surface 28a.

The fine flow path 140 can change the direction of the refrigerant flow in a direction parallel to a surface 2a of the assembly 2 facing the cooling member 4 side, that is, a surface direction along the bottom surface of the assembly 2 or the first wall surface 28a. The main flow S of the refrigerant travels downstream in the flow path 28, and is changed in direction to the left-right direction by the fine flow path 140. As a result, the flow rate of the refrigerant can be made uniform in the entire flow path 28. As a result, the assembly 2 can be cooled more uniformly.

Further, the cooling member 4 has, for example, the cylindrical insertion portion 144 through which the fastening member 142 for fixing the assembly 2 and the cooling member 4 is inserted. The insertion portion 144 is a recess provided in the second plate portion 26b and protruding toward the first plate portion 26a in the flow path 28. The insertion portion 144 may be provided in the first plate portion 26a and protrude toward the second plate portion 26b. The insertion portion 144 has a bottomed tubular shape, and has a bottom portion 144a connected to the other plate portion, that is, the first plate portion 26a in the present embodiment. The bottom portion 144a is joined to the other plate portion by, for example, brazing. The cooling member 4 has a through hole 146 that penetrates the bottom portion 144a and the other plate portion. The fastening member 142 is inserted through the through hole 146.

At least some of the second portions 134b, in other words, the fine flow paths 140 are arranged on the downstream side of the refrigerant flow with respect to the insertion portion 144 of the fastening member 142 for fixing the assembly 2 and the cooling member 4. The flow of the refrigerant flowing through the flow path 28 is blocked by the insertion portion 144. On the other hand, by arranging the second portions 134b behind the insertion portion 144 in the direction in which the refrigerant flows, the refrigerant can be sent to the back side of the insertion portion 144 by the fine flow paths 140. As a result, the flow rate of the refrigerant can be made uniform in the entire flow path 28. As a result, the assembly 2 can be cooled more uniformly.

Further, the cooling member 4 has the plurality of fine flow paths 140, and the two adjacent fine flow paths 140 extend so as to approach each other as they advance from the upstream side to the downstream side of the flow path 28. As a result, the refrigerant flowing through the flow path 28 can be more agitated. Further, by arranging the insertion portion 144 on the upstream side of the two fine flow paths 140 and between the two fine flow paths 140, the refrigerant can be sent to the back side of the insertion portion 144.

The plurality of band-shaped members 134 arranged in the upstream-downstream direction of the flow path 28 may have the second portions 134b so that the fine flow paths 140 sift in the direction intersecting the upstream-downstream direction. For example, the flow paths 140 are arranged in a staggered pattern on the XY plane. As a result, the flow rate of the refrigerant can be made more uniform in the entire flow path 28.

As described above, the battery module 1 according to the present embodiment includes the assembly 2 of the plurality of batteries 6 and the cooling member 4 arranged so as to be heat exchangeable with the assembly 2. The cooling member 4 includes the flow path 28 through which the refrigerant flows, and the mixing portions 130 which are arranged in the middle of the flow path 28 and generate the refrigerant flows in the direction approaching or separating from the assembly 2 in the direction Z in which the assembly 2 and the cooling member 4 are aligned.

As described above, in the present embodiment, the mixing portions 130 are provided in the middle of the flow path 28, that is, in the flow path 28, and the development of the temperature boundary layer is suppressed by mixing the refrigerant by the mixing portions 130. Therefore, unlike the case where large cross-sectional area portions are provided in the flow path as in the conventional battery module, it is possible to avoid an increase in the size of the flow path. Therefore, according to the present embodiment, it is possible to make the cooling of the assembly 2 uniform while avoiding the increase in size of the battery module 1. Further, the uniform cooling of the assembly 2 can suppress the deterioration of the performance of the battery module 1.

Further, in the battery module 1, heat exchange between the refrigerant and the assembly 2 via the first wall surface 28a located on the assembly 2 side occurs preferentially over heat exchange via the other wall surfaces. Therefore, the temperature boundary layer easily develops along the first wall surface 28a. On the other hand, in the present embodiment, the mixing portions 130 generate the refrigerant flows in the direction of approaching or separating from the assembly 2. As a result, the development of the temperature boundary layer along the first wall surface 28a can be particularly suppressed. Therefore, as compared with the conventional case where the flow velocity of the refrigerant is increased or decreased to suppress the development of the temperature boundary layer, the development of the temperature boundary layer can be efficiently suppressed with a simpler structure.

Further, the mixing portions 130 of the present embodiment are each formed by the protruding portion 132 arranged on the first wall surface 28a located on the assembly 2 side of the inner wall surfaces of the flow path 28. As a result, the development of the temperature boundary layer can be suppressed with a simpler structure.

Further, the cooling member 4 includes, in the flow path 28, the band-shaped members 134 extending in the direction intersecting the flow path 28. The band-shaped member 134 includes the plurality of first portions 134a which are in contact with the first wall surface 28a and form the protruding portions 132, and the second portions 134b which each protrude between the adjacent first portions 134a toward the second wall surface 28b facing the first wall surface 28a, and each have the tip portion 136 which abuts on the second wall surface 28b. In this way, by providing one member with the function of the protruding portion 132 and the function of fixing the protruding portion 132 in the flow path 28, the development of the temperature boundary layer can be suppressed with a simpler structure.

Further, the protruding portion 132 has an elongated shape that is long in the direction intersecting the flow path 28 and the direction parallel to the first wall surface 28a. Further, the cooling member 4 has the fine flow paths 140 that extend so as to shift in the direction intersecting the flow path 28 and the direction parallel to the first wall surface 28a as they advance from the upstream side to the downstream side of the flow path 28. The fine flow paths 140 can change the direction of the refrigerant flow in the direction parallel to the surface 2a of the assembly 2 facing the cooling member 4 side. As a result, the flow rate of the refrigerant can be made uniform in the entire cooling member 4. As a result, the assembly 2 can be cooled more uniformly.

Further, in the second portion 134b of the present embodiment, the groove portion 148 that extends so as to shift in the direction intersecting the flow path 28 and the direction parallel to the first wall surface 28a as it advances from the upstream side to the downstream side of the flow path 28, and opens to the first wall surface 28a side is provided, and the fine flow path 140 is formed by the groove portion 148. Further, the second portion 134b includes the tip portion 136 that abuts on the second wall surface 28b, and the pair of side walls 138 each connecting the first portion 134a and the tip portion 136. The pair of side walls 138 extend so as to shift in the direction intersecting the flow path 28 and the direction parallel to the first wall surface 28a as they advance from the upstream side to the downstream side of the flow path 28. The groove portion 148 is formed by the tip portion 136 and the pair of side walls 138.

The fine flow path 140 provided in the second portion 134b is not limited to the above configuration. For example, when the second portion 134b is a solid pillar, a linear groove extending diagonally like the groove portion 148 is provided on the outer surface of the pillar, and a flow path partitioned by this groove and the first wall surface 28a or a flow path partitioned by this groove and the second wall surface 28b may be a fine flow path 140.

Further, the cooling member 4 of the present embodiment includes the plurality of fine flow paths 140. The two adjacent fine flow paths 140 extend so as to approach each other as they advance from the upstream side to the downstream side of the flow path 28. Further, the second portion 134b includes the tip portion 136 that abuts on the second plate portion 26b, and the pair of side walls 138 each connecting the first portion 134a and the tip portion 136, and the side walls 138 extend diagonally from the first wall surface 28a toward the second wall surface 28b. Further, the cooling member 4 is a flat plate-shaped pipe, and includes the first plate portion 26a facing the assembly 2, the second plate portion 26b on the side opposite to the first plate portion 26a, and the recess provided in one plate portion and protruding toward the other plate portion in the flow path 28. The fine flow paths 140 are arranged on the downstream side of the refrigerant flow with respect to the recess. As a result, the flow rate of the refrigerant can be made uniform in the entire cooling member 4. As a result, the assembly 2 can be cooled more uniformly.

Further, the recess has a bottomed tubular shape, and has the bottom portion 144a connected to the other plate portion. The cooling member 4 has a through hole 146 that penetrates the bottom portion 144a and the other plate portion. Further, the cooling member 4 has a gap between the protruding portions 132 and the second wall surface 28b facing the first wall surface 28a of the inner wall surfaces of the flow path 28. Further, the cooling member 4 includes the first plate portion 26a and the second plate portion 26b which face each other with a predetermined gap, and the flow path 28 is arranged in the gap.

The embodiment of the present disclosure has been described in detail above. The above-described embodiment merely shows a specific example in carrying out the present disclosure. The content of the embodiment does not limit the technical scope of the present disclosure, and many designs such as modification, addition, and deletion of components can be made without departing from the ideas of the present disclosure defined in the claims. A new embodiment with the design change has the effects of the combined embodiment and the modification. In the above-described embodiment, the contents that can be changed in design are emphasized by adding notations such as "of the present embodiment" or "in the present embodiment", but design changes are allowed even in contents without such notations. Any combination of the above components is also effective as an aspect of the present disclosure. The hatching attached to the cross section of the drawing does not limit the material to which the hatching is attached.

In the second embodiment, the battery 6 is a square battery, but the shape of the battery 6 is not particularly limited and may be cylindrical or the like. Further, the number of the batteries 6 included in the assembly 2 is not particularly limited. The flow paths 28 extend along the direction X, but the direction is not particularly limited. Further, the assembly 2 and the cooling member 4 may be held in direct abutment on each other. The structure of each part of the assembly 2 including the shape of the separator 8 and the fastening structure between the end plate 10 and the restraining member 12 is not particularly limited.

The invention claimed is:

1. A battery module, comprising:
an assembly of a plurality of batteries; and
a cooling member arranged so as to be heat exchangeable with the assembly,
wherein the cooling member is provided with a mixing portion in which refrigerant flows and the flowing refrigerant is mixed,
wherein the cooling member has a hollow portion through which refrigerant flows,
wherein the hollow portion includes a branch portion including a plurality of flow paths, and a merging portion which is the mixing portion and is a space where the plurality of flow paths are merged,
wherein at least a part of the merging portion is provided at a position that does not overlap with the battery when viewed from a direction in which the assembly and the cooling member are aligned,
wherein the assembly includes a plurality of battery groups each including a plurality of stacked batteries, a pair of end plates sandwiching the plurality of batteries, and a restraining member that engages with the pair of end plates and restrains the plurality of batteries, and
wherein the merging portion is provided at a position that overlaps with a gap between the adjacent battery groups, the end plate, or the restraining member when viewed from the direction in which the assembly and the cooling member are aligned.

2. A battery module, comprising:
an assembly of a plurality of batteries; and
a cooling member arranged so as to be heat exchangeable with the assembly,
wherein the cooling member is provided with a mixing portion in which refrigerant flows and the flowing refrigerant is mixed,
wherein the cooling member has a hollow portion through which refrigerant flows,
wherein the hollow portion includes a branch portion including a plurality of flow paths, and a merging portion which is the mixing portion and is a space where the plurality of flow paths are merged, and
wherein the merging portion includes at least one flow blocking portion that disturbs a flow of refrigerant.

3. The battery module according to claim 2,
wherein the cooling member is a flat plate-shaped pipe, and includes a first plate portion facing the assembly and a second plate portion on a side opposite to the first plate portion, and
the flow blocking portion includes a side wall extending from one plate portion toward the other plate portion within the merging portion.

4. The battery module according to claim 3,
wherein the side wall has a collision surface on which refrigerant flowing through the merging portion hits, and
the collision surface extends in a direction intersecting a direction from an inlet to an outlet of refrigerant in the merging portion.

5. The battery module according to claim 4, wherein the collision surface has a curved surface shape.

6. The battery module according to claim 4,
wherein the flow blocking portion is cylindrical or columnar, and
the side wall is formed by a peripheral surface of the flow blocking portion.

7. The battery module according to claim 2, wherein a plurality of the flow blocking portions are arranged at predetermined intervals along a direction intersecting a direction from an inlet to an outlet of refrigerant in the merging portion.

8. The battery module according to claim 2,
wherein the cooling member is a flat plate-shaped pipe, and includes a first plate portion facing the assembly and a second plate portion on a side opposite to the first plate portion, and
the flow blocking portion is a recess provided in one plate portion and protruding toward the other plate portion.

9. The battery module according to claim 8,
wherein the recess has a bottomed tubular shape, and has a bottom portion connected to the other plate portion, and
the cooling member has a through hole that penetrates the bottom portion and the other plate portion.

10. A battery module, comprising:
an assembly of a plurality of batteries; and
a cooling member arranged so as to be heat exchangeable with the assembly,
wherein the cooling member is provided with a mixing portion in which refrigerant flows and the flowing refrigerant is mixed,
wherein the cooling member has a hollow portion through which refrigerant flows,
wherein the hollow portion includes a branch portion including a plurality of flow paths, and a merging portion which is the mixing portion and is a space where the plurality of flow paths are merged,
wherein the cooling member includes a first plate portion and a second plate portion which face each other with a predetermined gap, and
wherein the hollow portion is arranged in the gap.

11. A battery module, comprising:
an assembly of a plurality of batteries; and
a cooling member arranged so as to be heat exchangeable with the assembly,
wherein the cooling member is provided with a mixing portion in which refrigerant flows and the flowing refrigerant is mixed,
wherein the cooling member has a hollow portion through which refrigerant flows,
wherein the hollow portion includes a branch portion including a plurality of flow paths, and a merging portion which is the mixing portion and is a space where the plurality of flow paths are merged,
wherein the hollow portion includes a plurality of the branch portions arranged from an upstream side to a downstream side of a refrigerant flow, and
wherein the merging portion is interposed between the two adjacent branch portions.

12. A battery module, comprising:
an assembly of a plurality of batteries; and
a cooling member arranged so as to be heat exchangeable with the assembly,
wherein the cooling member is provided with a mixing portion in which refrigerant flows and the flowing refrigerant is mixed,
wherein the cooling member includes a flow path through which refrigerant flows, and
wherein the mixing portion is arranged in the middle of the flow path, and is structured to generate a refrigerant flow in a direction approaching or separating from the assembly in a direction in which the assembly and the cooling member are aligned.

13. The battery module according to claim 12, wherein the mixing portion has a protruding portion arranged on a first wall surface located on the assembly side of inner wall surfaces of the flow path.

14. The battery module according to claim 13, wherein the protruding portion has an elongated shape that is long in a direction intersecting the flow path and a direction parallel to the first wall surface.

15. The battery module according to claim 13,
wherein the cooling member includes, in the flow path, a band-shaped member extending in a direction intersecting the flow path, and
the band-shaped member includes:
a plurality of first portions which are in contact with the first wall surface and each form the protruding portion; and
a second portion which protrudes between the adjacent first portions toward the second wall surface facing the first wall surface, and has a tip portion which abuts on the second wall surface.

16. The battery module according to claim 15, wherein the cooling member has a fine flow path that extends so as to shift in a direction intersecting the flow path and a direction parallel to the first wall surface as the fine flow path advances from an upstream side to a downstream side of the flow path.

17. The battery module according to claim 16,
wherein, in the second portion, a groove portion that extends so as to shift in the direction intersecting the flow path and the direction parallel to the first wall surface as the groove portion advances from the upstream side to the downstream side of the flow path, and opens to the first wall surface side is provided; and
the fine flow path is formed by the groove portion.

18. The battery module according to claim 17,
wherein the second portion includes a tip portion that abuts on the second wall surface, and a pair of side walls each connecting the first portion and the tip portion,
the pair of side walls extend so as to shift in the direction intersecting the flow path and the direction parallel to the first wall surface as the pair of side walls advances from the upstream side to the downstream side of the flow path, and
the groove portion is formed by the tip portion and the pair of side walls.

19. The battery module according to claim 16,
wherein the cooling member has a plurality of the fine flow paths, and
the two adjacent fine flow paths extend so as to approach each other as the two adjacent fine flow paths advance from the upstream side to the downstream side of the flow path.

20. The battery module according to claim 15,
wherein the second portion includes a tip portion that abuts on the second wall surface, and a pair of side walls each connecting the first portion and the tip portion, and
the side walls extend diagonally from the first wall surface toward the second wall surface.

21. The battery module according to claim 16,
wherein the cooling member is a flat plate-shaped pipe, and includes a first plate portion facing the assembly, a second plate portion on a side opposite to the first plate portion, and a recess provided in one plate portion and protruding toward the other plate portion in the flow path, and
the fine flow path is arranged on a downstream side of a refrigerant flow with respect to the recess.

22. The battery module according to claim 21,
wherein the recess has a bottomed tubular shape, and has a bottom portion connected to the other plate portion, and
the cooling member has a through hole that penetrates the bottom portion and the other plate portion.

23. The battery module according to claim 13, wherein the cooling member has a gap between the protruding portion and a second wall surface facing the first wall surface of inner wall surfaces of the flow path.

24. The battery module according to claim 12,
wherein the cooling member includes a first plate portion and a second plate portion which face each other with a predetermined gap, and
the flow path is arranged in the gap.

* * * * *